United States Patent
Price et al.

(10) Patent No.: US 11,972,569 B2
(45) Date of Patent: Apr. 30, 2024

(54) SEGMENTING OBJECTS IN DIGITAL IMAGES UTILIZING A MULTI-OBJECT SEGMENTATION MODEL FRAMEWORK

(71) Applicant: Adobe Inc., San Jose, CA (US)

(72) Inventors: Brian Price, San Jose, CA (US); David Hart, Orem, UT (US); Zhihong Ding, Fremont, CA (US); Scott Cohen, Sunnyvale, UT (US)

(73) Assignee: Adobe Inc., San Jose, CA (US)

( * ) Notice: Subject to any disclaimer, the term of this patent is extended or adjusted under 35 U.S.C. 154(b) by 58 days.

(21) Appl. No.: 17/158,527

(22) Filed: Jan. 26, 2021

(65) Prior Publication Data

US 2022/0237799 A1 Jul. 28, 2022

(51) Int. Cl.
*G06T 7/11* (2017.01)
*G06T 3/40* (2006.01)
(Continued)

(52) U.S. Cl.
CPC ............ *G06T 7/11* (2017.01); *G06T 3/4046* (2013.01); *G06T 7/174* (2017.01); *G06T 7/187* (2017.01)

(58) Field of Classification Search
CPC . G06T 7/11; G06T 7/187; G06T 7/174; G06T 3/4046; G06T 2207/20; G06T 2207/20084; G06T 7/10; G06T 2207/20081; G06T 7/194; G06T 2207/10; G06T 2207/10024; G06N 3/02;
(Continued)

(56) References Cited

U.S. PATENT DOCUMENTS

| 6,389,168 B2 | 5/2002 | Altunbasak et al. |
| 6,469,706 B1 | 10/2002 | Syeda-Nahmood |

(Continued)

FOREIGN PATENT DOCUMENTS

| CN | 103366178 A | 10/2013 |
| CN | 107563494 A | 1/2018 |

(Continued)

OTHER PUBLICATIONS

Examination Report as received in Australian application 2020202602 dated Oct. 18, 2021.

(Continued)

*Primary Examiner* — Gandhi Thirugnanam
(74) *Attorney, Agent, or Firm* — Keller Preece PLLC

(57) ABSTRACT

The present disclosure relates to a multi-model object segmentation system that provides a multi-model object segmentation framework for automatically segmenting objects in digital images. In one or more implementations, the multi-model object segmentation system utilizes different types of object segmentation models to determine a comprehensive set of object masks for a digital image. In various implementations, the multi-model object segmentation system further improves and refines object masks in the set of object masks utilizing specialized object segmentation models, which results in more improved accuracy and precision with respect to object selection within the digital image. Further, in some implementations, the multi-model object segmentation system generates object masks for portions of a digital image otherwise not captured by various object segmentation models.

20 Claims, 16 Drawing Sheets

(51) Int. Cl.
  *G06T 3/4046* (2024.01)
  *G06T 7/174* (2017.01)
  *G06T 7/187* (2017.01)

(58) Field of Classification Search
  CPC .......... G06N 3/04; G06N 3/0454; G06N 3/08;
          G06N 3/084; G06V 10/70; G06V 10/82;
          G06V 10/764; G06V 10/25; G06V
          10/443; G06V 10/449; G06V 10/451;
          G06V 10/454; G06K 9/62; G06K 9/6217;
          G06K 9/6256
  See application file for complete search history.

(56) References Cited

U.S. PATENT DOCUMENTS

| | | | |
|---|---|---|---|
| 8,107,726 | B2 | 1/2012 | Xu et al. |
| 8,385,688 | B2 | 2/2013 | Gong et al. |
| 8,818,024 | B2 | 8/2014 | Chen et al. |
| 8,879,855 | B2 | 11/2014 | Angelova et al. |
| 9,053,115 | B1 | 6/2015 | Rosenberg |
| 9,129,191 | B2 | 9/2015 | Cohen et al. |
| 9,171,230 | B2 | 10/2015 | Jiang et al. |
| 9,443,316 | B1 * | 9/2016 | Takeda ................. G06V 10/945 |
| 9,495,764 | B1 | 11/2016 | Boardman et al. |
| 9,576,223 | B2 | 2/2017 | Aupetit et al. |
| 9,619,488 | B2 | 4/2017 | Ambardekar et al. |
| 9,690,778 | B2 | 6/2017 | Masuko |
| 9,720,934 | B1 | 8/2017 | Dube et al. |
| 9,746,981 | B2 | 8/2017 | Zachut et al. |
| 9,858,496 | B2 | 1/2018 | Sun et al. |
| 10,083,171 | B1 | 9/2018 | Yang et al. |
| 10,083,521 | B1 | 9/2018 | Dhua et al. |
| 10,109,051 | B1 | 10/2018 | Natesh et al. |
| 10,146,751 | B1 | 12/2018 | Zhang |
| 10,192,129 | B2 | 1/2019 | Price et al. |
| 10,204,289 | B2 | 2/2019 | Duan et al. |
| 10,216,766 | B2 | 2/2019 | Lin et al. |
| 10,353,948 | B2 | 7/2019 | Perez de la Coba |
| 10,410,096 | B2 | 9/2019 | Dijkman et al. |
| 10,430,649 | B2 | 10/2019 | Pao et al. |
| 10,496,880 | B2 | 12/2019 | Ye |
| 10,614,366 | B1 | 4/2020 | Zhang et al. |
| 10,713,794 | B1 | 7/2020 | He et al. |
| 10,740,647 | B2 | 8/2020 | Du et al. |
| 10,867,216 | B2 | 12/2020 | Skaff et al. |
| 10,893,283 | B2 | 1/2021 | Chen et al. |
| 11,010,605 | B2 * | 5/2021 | Nord ................. G06F 18/214 |
| 11,055,566 | B1 | 7/2021 | Pham et al. |
| 11,107,219 | B2 | 8/2021 | Cohen et al. |
| 11,176,384 | B1 | 11/2021 | Yang et al. |
| 11,182,408 | B2 | 11/2021 | Wu et al. |
| 11,188,783 | B2 | 11/2021 | Cricri et al. |
| 11,417,097 | B2 | 8/2022 | Lin et al. |
| 11,487,975 | B2 | 11/2022 | Kim |
| 11,631,234 | B2 | 4/2023 | Cohen et al. |
| 2003/0179213 | A1 | 9/2003 | Liu |
| 2003/0198380 | A1 | 10/2003 | Shin et al. |
| 2003/0233224 | A1 | 12/2003 | Marchisio et al. |
| 2008/0069444 | A1 | 3/2008 | Wilensky |
| 2008/0117209 | A1 | 5/2008 | Razeto |
| 2009/0281925 | A1 | 11/2009 | Winter et al. |
| 2009/0316988 | A1 | 12/2009 | Xu et al. |
| 2010/0158412 | A1 | 6/2010 | Wang et al. |
| 2010/0166321 | A1 | 7/2010 | Sawant et al. |
| 2010/0232643 | A1 | 9/2010 | Chen et al. |
| 2011/0026835 | A1 | 2/2011 | Ptucha et al. |
| 2011/0029553 | A1 | 2/2011 | Bogart et al. |
| 2011/0085739 | A1 | 4/2011 | Zhang et al. |
| 2011/0216973 | A1 | 9/2011 | Mojsilovic |
| 2013/0120454 | A1 | 5/2013 | Shechtman et al. |
| 2013/0257886 | A1 | 10/2013 | Kerofsky et al. |
| 2014/0334722 | A1 | 11/2014 | Bloore et al. |
| 2015/0002904 | A1 | 1/2015 | Nakamura |
| 2015/0169142 | A1 | 6/2015 | Longo et al. |
| 2015/0170005 | A1 | 6/2015 | Cohen et al. |
| 2015/0213058 | A1 | 7/2015 | Ambardekar et al. |
| 2015/0228086 | A1 | 8/2015 | Maurer et al. |
| 2015/0305609 | A1 | 10/2015 | Hoberman et al. |
| 2015/0379006 | A1 | 12/2015 | Dorner et al. |
| 2016/0342863 | A1 | 11/2016 | Kwon et al. |
| 2017/0017696 | A1 | 1/2017 | Alonso |
| 2017/0083752 | A1 | 3/2017 | Saberian et al. |
| 2017/0140236 | A1 | 5/2017 | Price et al. |
| 2017/0206431 | A1 * | 7/2017 | Sun ....................... G06F 16/951 |
| 2017/0213112 | A1 | 7/2017 | Sachs et al. |
| 2017/0242913 | A1 | 8/2017 | Tijssen et al. |
| 2017/0255378 | A1 | 9/2017 | Desai |
| 2017/0277948 | A1 | 9/2017 | Dhua et al. |
| 2017/0287137 | A1 | 10/2017 | Lin et al. |
| 2017/0364771 | A1 | 12/2017 | Pinheiro et al. |
| 2018/0089203 | A1 | 3/2018 | Soni et al. |
| 2018/0108137 | A1 | 4/2018 | Price et al. |
| 2018/0121768 | A1 | 5/2018 | Lin et al. |
| 2018/0240243 | A1 * | 8/2018 | Kim ........................ G06T 7/162 |
| 2018/0260793 | A1 | 9/2018 | Li et al. |
| 2018/0267997 | A1 | 9/2018 | Lin et al. |
| 2018/0285686 | A1 | 10/2018 | Pinheiro et al. |
| 2018/0342863 | A1 | 11/2018 | Radun |
| 2019/0019318 | A1 | 1/2019 | Cinnamon et al. |
| 2019/0096125 | A1 | 3/2019 | Schulter et al. |
| 2019/0108250 | A1 | 4/2019 | Miller et al. |
| 2019/0130229 | A1 | 5/2019 | Lu et al. |
| 2019/0236394 | A1 | 8/2019 | Price et al. |
| 2019/0252002 | A1 | 8/2019 | Ding et al. |
| 2019/0278800 | A1 | 9/2019 | Fulton et al. |
| 2019/0279074 | A1 * | 9/2019 | Lin ....................... G06F 16/583 |
| 2019/0354609 | A1 | 11/2019 | Huang et al. |
| 2020/0020108 | A1 | 1/2020 | Pao et al. |
| 2020/0074185 | A1 | 3/2020 | Rhodes et al. |
| 2020/0175344 | A1 | 6/2020 | Li et al. |
| 2020/0218931 | A1 | 7/2020 | Karlinsky et al. |
| 2020/0242357 | A1 | 7/2020 | Brouard et al. |
| 2020/0250538 | A1 | 8/2020 | Li et al. |
| 2020/0294293 | A1 | 9/2020 | Boenig, II et al. |
| 2020/0302168 | A1 * | 9/2020 | Vo ............................ G06T 7/136 |
| 2020/0302230 | A1 | 9/2020 | Chang et al. |
| 2020/0334487 | A1 | 10/2020 | Du et al. |
| 2020/0334501 | A1 | 10/2020 | Lin et al. |
| 2020/0349362 | A1 | 11/2020 | Maloney |
| 2021/0027448 | A1 | 1/2021 | Cohen et al. |
| 2021/0027471 | A1 * | 1/2021 | Cohen ................. G06F 16/3344 |
| 2021/0027497 | A1 | 1/2021 | Ding et al. |
| 2021/0056713 | A1 | 2/2021 | Rangesh et al. |
| 2021/0117948 | A1 * | 4/2021 | Voss ..................... G06Q 20/322 |
| 2021/0142497 | A1 | 5/2021 | Pugh et al. |
| 2021/0192375 | A1 | 6/2021 | Xia et al. |
| 2021/0263962 | A1 * | 8/2021 | Chang ................... G06F 40/30 |
| 2021/0358130 | A1 * | 11/2021 | Cohen ................... G06V 10/82 |
| 2021/0366128 | A1 | 11/2021 | Kim et al. |
| 2021/0397876 | A1 | 12/2021 | Hemani et al. |
| 2022/0084209 | A1 | 3/2022 | Wang et al. |
| 2022/0101531 | A1 * | 3/2022 | Zhang ................... G06N 3/084 |
| 2022/0230321 | A1 | 7/2022 | Zhao et al. |
| 2022/0237799 | A1 * | 7/2022 | Price ..................... G06T 3/4046 |
| 2023/0128276 | A1 | 4/2023 | Erickson et al. |

FOREIGN PATENT DOCUMENTS

| | | |
|---|---|---|
| CN | 112561920 A | 3/2021 |
| DE | 102019102484 A1 | 8/2020 |
| EP | 3 300 024 A1 | 3/2018 |
| WO | WO 2017/007626 A1 | 1/2017 |
| WO | WO 2017/198909 A1 | 11/2017 |
| WO | 2019/079895 A1 | 5/2019 |
| WO | WO 2019/110583 A1 | 6/2019 |
| WO | WO 2020/101777 A1 | 5/2020 |
| WO | WO 2021/179205 A1 | 9/2021 |

OTHER PUBLICATIONS

Intention to Grant as received in Australian application 2018250370 dated Oct. 21, 2021.

(56) References Cited

OTHER PUBLICATIONS

U.S. Appl. No. 16/518,810, Oct. 27, 2021, Office Action.
Examination Report as received in Australian application 2020202601 dated Nov. 5, 2021.
Examination Report as received in United Kingdom application GB2005865.7 dated Dec. 14, 2021.
U.S. Appl. No. 16/518,850, Jan. 25, 2022, Office Action.
Examination Report as received in Australian application 2018250370 dated Jun. 10, 2021.
U.S. Appl. No. 16/518,880, Apr. 7, 2021, Notice of Allowance.
U.S. Appl. No. 16/518,810, Apr. 16, 2021, 1st Action Office Action.
U.S. Appl. No. 16/518,795, May 6, 2021, Office Action.
U.S. Appl. No. 16/817,418, Mar. 22, 2021, Notice of Allowance.
U.S. Appl. No. 16/518,850, Apr. 6, 2021, Preinterview 1st Office Action.
U.S. Appl. No. 16/518,850, May 28, 2021, 1st Action Office Action.
U.S. Appl. No. 16/518,810, Aug. 10, 2022, Office Action.
U.S. Appl. No. 16/518,850, Jun. 1, 2022, Notice of Allowance.
U.S. Appl. No. 16/800,415, Jul. 20, 2022, Notice of Allowance.
Examination Report as received in United Kingdom application GB2005865.7 dated Sep. 14, 2021.
Examination Report as received in Australian application 2020202658 dated Aug. 23, 2021.
Examination Report as received in Australian application 2020202602 dated Sep. 14, 2021.
Intention to Grant as received in United Kingdom Application GB2005704.8 dated Sep. 30, 2021.
U.S. Appl. No. 16/518,795, Sep. 15, 2021, Notice of Allowance.
Combined Search and Examination Report as received in UK Application GB2005865.7 dated Jan. 11, 2021.
Notice of Grant as received in Australian application 2020201988 dated Mar. 17, 2022.
U.S. Appl. No. 16/919,383, Feb. 10, 2022, Notice of Allowance.
U.S. Appl. No. 16/800,415, Feb. 17, 2022, Preinterview 1st Office Action.
Examination Report as received in Australian application 2020201988 dated Oct. 29, 2021.
U.S. Appl. No. 16/518,850, Nov. 4, 2021, Office Action.
U.S. Appl. No. 16/518,810, Jul. 15, 2021, Office Action.
U.S. Appl. No. 16/518,850, Jun. 18, 2021, Office Action.
Examination Report as received in Australian application 2020202602 dated Nov. 22, 2021.
Notice of Grant as received in Australian Application 2020202658 dated Dec. 23, 2021.
Notice of Grant as received in United Kingdom application GB2005704.8 dated Nov. 16, 2021.
U.S. Appl. No. 16/518,795, Dec. 7, 2021, Notice of Allowance.
J. Uijlings, K. van de Sande, T. Gevers, and A. Smeulders. Selective Search For Object Recognition, IJCV, 2013.
Joseph Redmon, Santosh Divvala, Ross Girshick, Ali Farhadi: You Only Look Once: Unified, Real-Time Object Detection, arXiv:1506.02640, May 6, 2016.
Bency, Archith John, et al. "Weakly supervised localization using deep feature maps." European Conference on Computer Vision. Springer, Cham, 2016, See Abstract and section 3.4.
Bolanos, Marc, and Petia Radeva. "Simultaneous food localization and recognition." 2016 23rd International Conference on Pattern Recognition (ICPR). IEEE, 2016 See Abstract, Figure 3 and the Methodology section.
Combined Search and Examination Report as received in United Kingdom Application GB1817588.5 dated Apr. 8, 2019.
Combined Search and Examination Report as received in United Kingdom Application GB2005714.7 dated Sep. 3, 2020.
Combined Search and Examination Report as received in United Kingdom Application GB2005704.8 dated Sep. 24, 2020.
Combined Search and Examination Report as received in United Kingdom Application GB2004362.6 dated Nov. 13, 2020.
Intention to Grant as received in United Kingdom Application GB1817588.5 dated Aug. 13, 2020.

Ning Xu et al., "Deep GrabCut for Object Selection," published Jul. 14, 2017.
S. Ren, K. He, R. Girshick, and J. Sun, Faster r-cnn: Towards real-time object detection with region proposal networks, NIPS, 2015.
Yi-Hsuan Tsai et al., "Sky is Not the Limit: Semantic-Aware Sky Replacement," ACM Transactions on Graphics (SIGGRAPH), 2016.
Yufei Wang et al., "Concept Mask: Large-Scale Segmentation from Semantic Concepts," The European Conference on Computer Vision (ECCV), Aug. 18, 2018.
Kirillov, Alexander & Girshick, Ross & He, Kaiming & Dollar, Piotr. (2019). Panoptic Feature Pyramid Networks. 6392-6401. 10.1109/CVPR.2019.00656.
Gouet, Valerie, and Nozha Boujemaa. "Object-based queries using color points of interest." Proceedings IEEE Workshop on Content-Based Access of Image and Video Libraries (CBAIVL 2001). IEEE, 2001. (Year: 2001).
Wang, Jiang, et al. "Learning fine-grained image similarity with deep ranking." Proceedings of the IEEE Conference on Computer Vision and Pattern Recognition. 2014. (Year: 2014).
Niblack, Carlton Wayne, et al. "QBIC project: querying images by content, using color, texture, and shape." Storage and retrieval for image and video databases. vol. 1908. International Society for Optics and Photonics, 1993. (Year: 1993).
Wan et al, Deep Learning for Content-Based Image Retrieval: Comprehensive Study, Published in MM '14: Proceedings of the ACM International Conference on Multimedia: Nov. 3-7, 2014, Orlando. pp. 157-166. http://doi.org/10.1145/2647868.2654948 (Year: 2014).
Carion, Nicolas et al. "End-to-End Object Detection with Transformers," arXiv preprint arXiv:2005.12872 (2020).
U-net architecture and use techniques and approaches found in Olaf Ronneberger et al., "U-Net: Convolutional Networks for Biomedical Image Segmentation," submitted on May 18, 2015, arXiv:1505.049597.
Wang et al. in Joint Object and Part Segmentation using Deep Learned Potentials, In Proc. International Conference on Computer Vision (ICCV), 2015.
J. Dong et al.; Towards Unified Human Parsing And Pose Estimation, In CVPR, pp. 843-850, 2014.
U.S. Appl. No. 15/921,492, Dec. 27, 2019, Office Action.
U.S. Appl. No. 15/921,492, Apr. 2, 2020, Notice of Allowance.
U.S. Appl. No. 16/518,880, Dec. 23, 2020, Office Action.
U.S. Appl. No. 16/518,810, Jan. 8, 2021, Preinterview 1st Office Action.
U.S. Appl. No. 16/518,795, Jan. 21, 2021, Preinterview 1st Office Action.
Intention to Grant as received in United Kingdom Application GB2005865.7 dated Mar. 23, 2022.
Intention to Grant as received in United Kingdom Application GB2004362.6 dated Apr. 8, 2022.
U.S. Appl. No. 16/518,810, Apr. 14, 2022, Office Action.
U.S. Appl. No. 16/800,415, Apr. 4, 2022, 1st Action Office Action.
Ahmed et al, Semantic Object Selection, IEEE Conference on Computer Vision and Pattern Recognition (pp. 3150-3157) ( Year: 2014).
Hu et al, Segmentation from Natural Language Expressions, Arxiv:1603.0618 (Year: 2016).
Deng et al, You Only Look & Listen Once: Towards Fast and Accurate Visual Grounding, arXiv:1902.04213 (Year: 2019).
U.S. Appl. No. 16/518,810, Dec. 5, 2022, Notice of Allowance.
U.S. Appl. No. 17/151,111, Oct. 12, 2022, Notice of Allowance.
U.S. Appl. No. 17/387,195, Oct. 24, 2022, Office Action.
U.S. Appl. No. 17/331,161, Dec. 30, 2022, Office Action.
U.S. Appl. No. 17/387,195, Jan. 31, 2023, Office Action.
U.S. Appl. No. 17/331,161, Feb. 10, 2023, Notice of Allowance.
U.S. Appl. No. 17/929,206, Jan. 19, 2023, Office Action.
U.S. Appl. No. 17/819,845, Nov. 13, 2023, Office Action.
U.S. Appl. No. 17/929,206, Sep. 18, 2023, Notice of Allowance.
U.S. Appl. No. 18/147,278, Oct. 12, 2023, Notice of Allowance.
U.S. Appl. No. 17/387,195, Jun. 14, 2023, Notice of Allowance.
U.S. Appl. No. 17/929,206, Jun. 6, 2023, Office Action.

(56) References Cited

OTHER PUBLICATIONS

Ak et al., Which shirt for my first date? Towards a flexible attribute-based fashion query system, Pattern Recognition Letters vol. 112, Sep. 1, 2018, pp. 212-218 (Year: 2018).
Jayaprabha, P., and RmSomasundaram. "Content Based Image Retrieval Methods Using Self Supporting Retrieval Map Algorithm." IJCSNS 13.1 (2013): 141 (Year: 2013).
U.S. Appl. No. 17/819,845, mail date Feb. 1, 2024, Notice of Allowance.
U.S. Appl. No. 18/191,651, mail date Jan. 5, 2024, Office Action.
U.S. Appl. No. 17/658,799, mail date Jan. 17, 2024, Office Action.

* cited by examiner

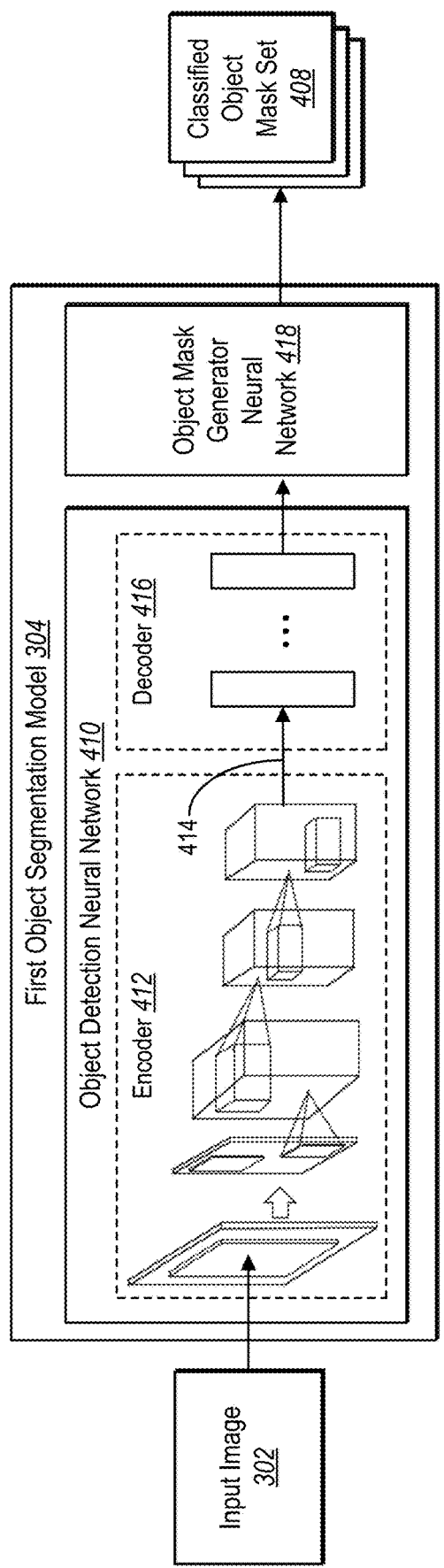
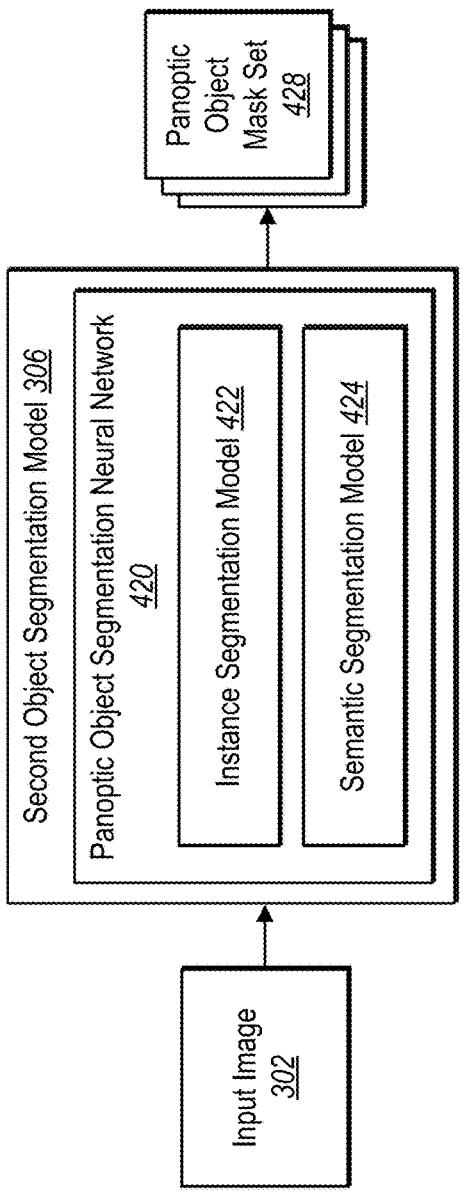
Fig. 4A
Fig. 4B

1200 ↴

```
┌─────────────────────────────────────────────────────────────┐
│  Generating A First And Second Set Of Object Masks For A    │
│                       Digital Image                         │
│                            1210                             │
└─────────────────────────────────────────────────────────────┘
                              │
                              ▼
┌─────────────────────────────────────────────────────────────┐
│  Detecting An Overlap Between The First Set Of Object       │
│       Masks And The Second Set Of Object Masks 1220         │
└─────────────────────────────────────────────────────────────┘
                              │
                              ▼
┌─────────────────────────────────────────────────────────────┐
│       Merging The Overlapping Object Masks To Generate      │
│                 A Combined Object Mask 1230                 │
└─────────────────────────────────────────────────────────────┘
                              │
                              ▼
┌─────────────────────────────────────────────────────────────┐
│  Generating A Third Set Of Object Masks With The Combined   │
│       Object Mask And Non-Overlapping Object Masks 1240     │
└─────────────────────────────────────────────────────────────┘
                              │
                              ▼
┌─────────────────────────────────────────────────────────────┐
│  Providing An Object Mask Of A Target Object Based On       │
│    Detecting A Selection Request Of The Target Object 1250  │
└─────────────────────────────────────────────────────────────┘
```

*Fig. 12*

SEGMENTING OBJECTS IN DIGITAL IMAGES UTILIZING A MULTI-OBJECT SEGMENTATION MODEL FRAMEWORK

BACKGROUND

Recent years have witnessed a significant increase in digital image editing. Indeed, advances in both hardware and software have increased the ability of individuals to capture, create, and edit digital images. For instance, the hardware on most modern computing devices (e.g., smartphones, tablets, servers, desktops, and laptops) enables both professionals and hobbyists to perform a variety of digital image editing operations. Similarly, improvements in software enable individuals to modify, filter, or otherwise edit digital images across a variety of computing devices. Examples of editing digital images include selecting an object and manipulating the object.

Notwithstanding these improvements, conventional systems continue to suffer from several problems with regard to the accuracy, efficiency, and flexibility of computing device operations, and in particular, with respect to object segmentation. For example, many conventional systems have limited functionality in the types of objects they segment in a digital image. As a result, these conventional systems are impeded from automatically segmenting some of the objects that may be included in a digital image. Instead, a user may need to attempt to manually select such objects, which leads to imprecise and unsatisfactory results as well as computational inefficiencies.

Accordingly, these along with additional problems and issues exist in current solutions with respect to the technical field of digital image editing.

BRIEF SUMMARY

Implementations of the present disclosure provide benefits and/or solve one or more of the foregoing or other problems in the art with systems, non-transitory computer-readable media, and methods that accurately and flexibly utilize a multi-model object segmentation framework to accurately and automatically segment all objects in digital images. For instance, the disclosed systems generate a comprehensive set of accurate and refined object masks for objects in a digital image utilizing a combination of different object segmentation models within the multi-model object segmentation framework. For example, the disclosed systems utilize multiple object segmentation machine-learning models to initially detect objects in the digital image, where objects detected by more than one model are combined for a more accurate selection of the objects. In addition, the disclosed systems utilize specialized object segmentation machine-learning models to refine the initially detected objects for improved object segmentation. Further the disclosed systems detect clusters of non-segmented pixels for potential segmentation. In this manner, the disclosed systems accurately and automatically segments an entire digital image. Once segmented, the disclosed systems return one or more of the segmented objects (or sub-objects) in response to a selection request.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

FIGS. 4A-4B illustrate block diagrams of utilizing multiple object segmentation models to generate multiple object mask sets for a digital image in accordance with one or more implementations.

FIG. 12 illustrates a flowchart of a series of acts of utilizing multiple object segmentation models to automatically select objects in digital images in accordance with one or more implementations.

DETAILED DESCRIPTION

Figure 1:
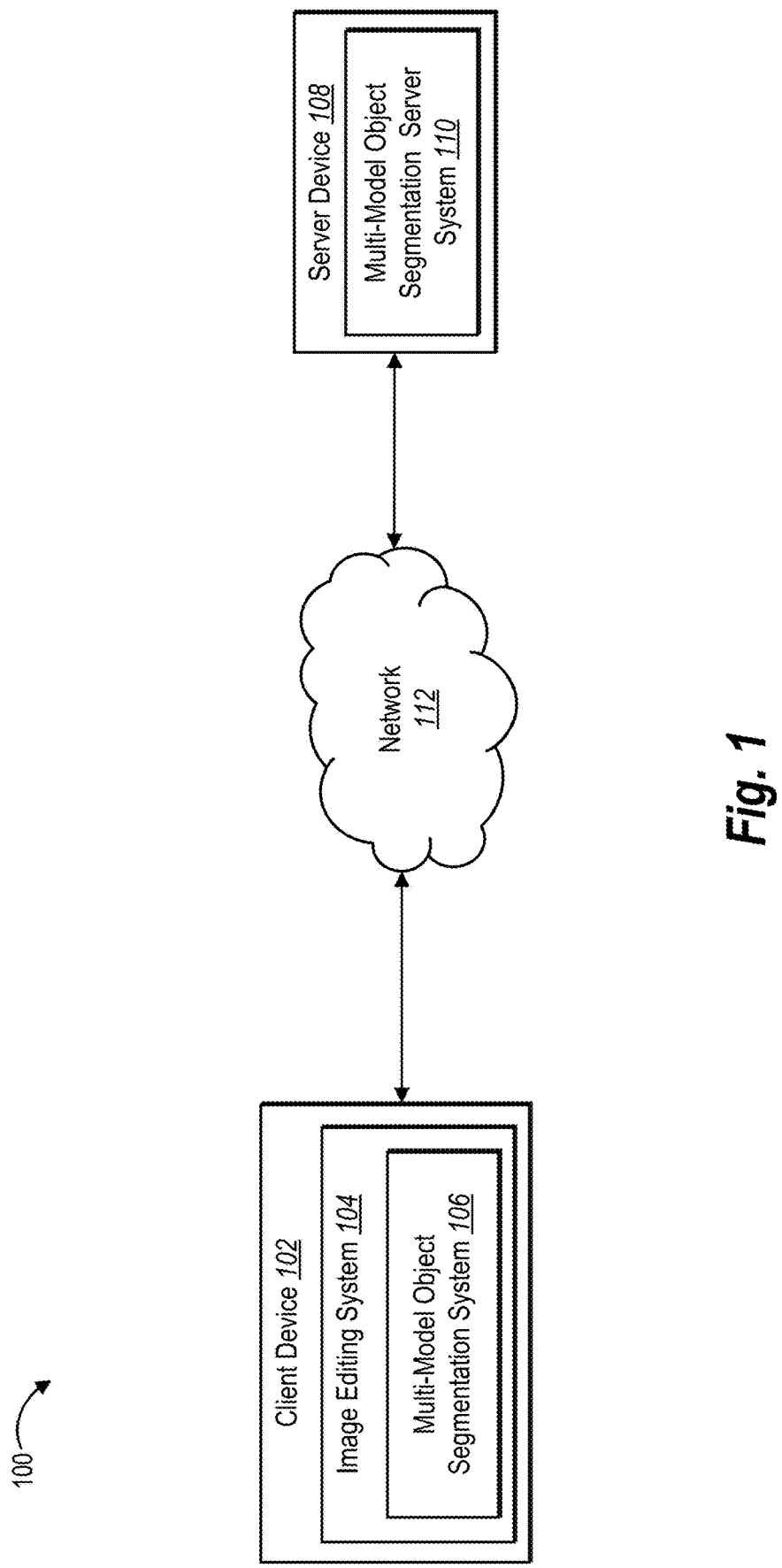
FIG. 1 illustrates a schematic diagram of a system environment in which a multi-model object segmentation system operates in accordance with one or more implementations.

This disclosure describes one or more implementations of a multi-model object segmentation system that utilizes a multi-model object segmentation framework to automatically segment objects in digital images. In one or more implementations, the multi-model object segmentation system utilizes different types of general object segmentation models to determine a set of object masks for a digital image. As another example, in a number of implementations, the multi-model object segmentation system improves and refines object masks by combining object mask and/or utilizing specialized object segmentation models. In some implementations, the multi-model object segmentation system generates object masks for objects and portions of a digital image otherwise typically not captured by the various object segmentation models alone.

To illustrate, in some implementations, the multi-model object segmentation system generates multiple sets of object masks for a digital image utilizing multiple object segmentation machine-learning models. In these implementations, the multi-model object segmentation system identifies any overlapping object masks in the digital image between the object segmentation machine-learning models. For each detected overlap, the multi-model object segmentation system merges the overlapping object masks into a single object mask. Further, in these implementations, the multi-model object segmentation system generates a combined or modified set of object masks for the digital image that includes merged object masks as well as any non-overlapping object masks from each of the object segmentation machine-learning models. Then, in response to detecting a selection request of a target object in the digital image, the multi-model object segmentation system provides an object mask of the target object from the combined set of object masks.

Indeed, the multi-model object segmentation system utilizes a multi-model object segmentation framework to generate a combined set of object masks that includes accurate and refined object masks such that all objects and regions in an image—including unknown objects and unclassified pixel regions—are segmented. In various implementations, the multi-model object segmentation framework includes multiple general object segmentation machine-learning models to segment as many objects as possible in a digital image, where objects segmented by more than one object segmentation machine-learning model are merged in a combined object mask set. Additionally, to ensure that the entire digital image is segmented, in various implementations, the multi-model object segmentation system utilizes an unknown pixel region mask generator to generate new object masks for previously unsegmented regions within the digital image, which are added to the combined object mask set.

As mentioned above, in various implementations, the multi-model object segmentation system generates multiple sets of object masks for a digital image utilizing multiple object segmentation machine-learning models. In one or more implementations, the multi-model object segmentation system utilizes a quality-based object segmentation machine-learning model to classify objects in a digital image and generate a first object mask set. For example, this object segmentation machine-learning model detects and labels a first number of objects belonging to known objects classes and generates object masks for the detected objects. In addition, the multi-model object segmentation system utilizes a quantity-based object segmentation machine-learning model to segment a second number of semantic objects in the digital image, such as all foreground and background objects, to generate a second object mask set. Often, the number of objects segmented by the two object segmentation machine-learning models differ.

In various implementations, the multi-model object segmentation system combines the first object mask set and the second object mask set to generate a combined object mask set (or merged object mask set). In some implementations, however, there is an overlap of segmented objects between the two object mask sets. Accordingly, in these implementations, for an object segmented in multiple object mask sets, the multi-model object segmentation system merges the overlapping object masks from each set into a single combined object mask by either creating a new object mask or modified mask of the overlapping object masks. In one or more implementations, the multi-model object segmentation system merges the two object masks when a threshold number of overlapping pixels satisfies a pixel overlap threshold. In particular, the multi-model object segmentation system combines the pixels from each of the overlapping object masks into a single combined object mask.

Further, in one or more implementations, the multi-model object segmentation system utilizes the multi-model object segmentation framework for automatically segmenting objects in digital images to further refine the combined set of object masks for the digital image. To illustrate, for one or more classified objects in the digital image, the multi-model object segmentation system determines that the object type matches a specialist object segmentation machine-learning model. In these implementations, the multi-model object segmentation system utilizes the specialist object segmentation machine-learning model to generate a more accurate and refined object mask for the object to be included in the combined object mask set, as further described below.

In some implementations, the multi-model object segmentation system utilizes a partial object segmentation machine-learning model in connection with a segmented object to segment multiple partial objects (e.g., object sub-parts). For example, in various implementations, the multi-model object segmentation system determines that a classified object type corresponds with a partial-object segmentation machine-learning model, such as a body part or facial segmentation machine-learning model. Here, the multi-model object segmentation system utilizes the matched partial-object segmentation machine-learning model to generate several additional partial-object masks for the object, which the multi-model object segmentation system adds to the combined object mask set in connection with the encompassing object mask.

As mentioned above, in various implementations, the multi-model object segmentation system includes an unknown pixel region mask generator. In some implementations, the unknown pixel region mask generator creates unlabeled object masks for clusters of pixels in the digital image that were not segmented by the other object segmentation machine-learning models in the multi-model object segmentation framework. Indeed, in one or more implementations, for adjoining pixels in the digital image that satisfy a minimum threshold, the multi-model object segmentation system utilizes the unknown pixel region mask generator to generate a new object mask for the pixel cluster, which is added to the combined object mask set. In this manner, in one or more embodiments, the multi-model object segmentation system ensures that the entire image is segmented.

Moreover, in various implementations, the multi-model object segmentation system verifies the consistency of the combined object mask set. For example, in one or more implementations, the multi-model object segmentation system verifies that multiple object masks in the same hierarchy of the combined object mask set do not include the same pixel. If a pixel is detected as belonging to multiple object masks, the multi-model object segmentation system utilizes one or more approaches to assign the pixel to a single object mask.

Further, in various implementations, the multi-model object segmentation system provides a graphical user interface for easy and intuitive selection of objects within a digital image. For example, in some implementations, a user selects a target object/region in a digital image. In response, the multi-model object segmentation system automatically selects the target object by providing an object mask corresponding to the region of the digital image selected (click on, tapped, hovered over, etc.). Indeed, because the multi-model object segmentation system has created accurate object masks for each object in the combined object mask set, the user is able to request the selection of any object in the digital image and the multi-model object segmentation system quickly and accurately selects the desired object.

As mentioned above, conventional object segmentation systems face a number of problems with regard to accuracy, efficiency, and flexibility of computing device operations, particularly with respect to segmenting and selecting objects in digital images. As a first example, many conventional systems are inaccurate. For instance, as mentioned above, several conventional systems fail to accurately segment objects in digital images. For example, many conventional systems do not segment objects that are background objects or conceptual objects (e.g., concept-based objects). Indeed, any pixels in a digital image that do not belong to a known classification are often left unlabeled and unsegmented, which results in conventional systems not being able to select some objects/regions.

For example, many conventional systems are trained to detect and segment a small set of objects in digital images, while excluding other objects. As a result, when a user desires a selection of a particular instance of an object, conventional object segmentation systems are unable to accurately segment the desired object. Moreover, in some cases, conventional object segmentation systems misclassify and/or fail to accurately identify known objects.

Also, some conventional systems are inaccurate because they provide imprecise results. For instance, while a few conventional object segmentation systems select individual masks of an object, the boundaries of these masks are rough and imprecise. Indeed, these conventional systems often produce object masks that include additional portions that are not part of the object (e.g., artifacts) or do not include the entire object. As a result, a user must manually correct the segmentation and/or manually segment the desired object.

As another problem with inaccuracy, many conventional systems do not facilitate segmentation and selection of object parts. In many conventional systems to segment a partial object, the object part typically must belong to a predefined classification of object parts, which is often limited to a specific object types. Thus, unless a partial object within a digital image matches one of the predefined object part classifications, the conventional systems will often fail to recognize the partial object. Further, when a conventional system is trained to detect object parts associated with a particular object type, the conventional system is more likely to miss detecting other types of objects in a digital image altogether.

Additionally, conventional systems are inflexible. As noted above, conventional systems are often rigidly limited to only recognizing objects that appeared during training. More particularly, many conventional systems utilize neural networks that identify and classify a limited predetermined set of objects in digital images. As a result, these conventional systems are restricted from recognizing objects in the digital images outside of the predetermined set. Similarly, most of these conventional systems are unable to detect and/or classify non-objects, such as the image backgrounds or other unquantifiable objects.

As another example of inefficiency, many conventional systems do not provide direct tools for automatic object segmentation of any object (or a non-object) in a digital image. Instead, individuals are left to use generic image editing tools and are unable to satisfactorily select a target object (or partial object). These tools are often imprecise as well as difficult to use. As a result, significant time and user interactions result in the wasting of substantial computing resources in detecting, segmenting, displaying, selecting, and correcting object selections in digital images.

As previously mentioned, the multi-model object segmentation system provides numerous advantages, benefits, and practical applications over conventional systems. As noted above, in many implementations, the multi-model object segmentation system improves accuracy, flexibility, and efficiency utilizing a multi-model object segmentation framework that accurately and automatically segments objects in digital images. To illustrate, regarding improvements to accuracy, in various implementations, the multi-model object segmentation system utilizes multiple object segmentation machine-learning models to segment objects in a digital image that a single object segmentation model may inaccurately miss. Further, by merging the object masks of objects segmented in both models, the multi-model object segmentation system is able to improve the accuracy of the object mask of the segmented objects. Thus, in many implementations, the multi-model object segmentation system creates a highly-accurate combined set of object masks for objects within digital images.

Additionally, the multi-model object segmentation system often utilizes additional specialized object segmentation machine-learning models to refine object masks. For example, in implementations where an object mask in the combined set of object masks corresponds to a specialist or partial-object segmentation machine-learning model, the multi-model object segmentation system utilizes the corresponding specialized object segmentation machine-learning model to generate a more accurate and improved object mask. Moreover, besides facilitating the accurate selection of objects in digital images, the multi-model object segmentation system enables the selection of non-objects that are not traditionally detected/segmented by conventional object segmentation models.

In one or more implementations, the multi-model object segmentation system improves flexibility over conventional systems. For example, the multi-model object segmentation system is not limited to object types witnessed during training. Rather, the multi-model object segmentation system openly segments all objects regardless of their classification type or whether the object has been witnessed during training. Indeed, the multi-model object segmentation system is able to segment objects across a large scope of object types and classes, even unknown classes. In this manner, the multi-model object segmentation system provides superior flexibility over conventional systems.

Moreover, in one or more implementations, the multi-model object segmentation system improves efficiency over conventional systems. For example, through generating and utilizing the disclosed multi-model object segmentation framework, the multi-model object segmentation system is able to improve segmentation of one or more objects within a digital image while skipping other object segmentation machine-learning models not relevant to the image. Further, in one or more implementations, the multi-model object segmentation system adds, replaces, and/or upgrades components within the framework with more efficient versions without having to modify or re-train other components of the multi-model object segmentation framework.

Further, in various implementations, the multi-model object segmentation system provides a graphical user interface that reduces the number of steps needed to select objects and partial objects within a digital image. For example, the multi-model object segmentation system enables a user to provide a selection request of a target object, and in response, the multi-model object segmentation system automatically selects the target object (i.e., provides a corresponding object mask or segmented object). In some implementations, the multi-model object segmentation system segments and then selects objects within digital images without requiring a tool selection. To illustrate, the multi-model object segmentation system facilitates the direct object selection and manipulation of any object within a digital image. Thus, unlike most conventional systems that require multiple tools and numerous manual operations to select an object, the multi-model object segmentation system facilitates accurate selection of an object with minimal user interaction (e.g., a click, mouse over, or hover).

Additionally, by preemptively segmenting all object (and optionally object parts), the multi-model object segmentation system is able to quickly return an object mask for any selected object or object part. In other works, the multi-model object segmentation system utilizes a pre-emptive segmentation for any subsequent object selection requests without having to reprocess the digital image. Thus, the object segmentation system both increases efficiency and reduces processing time.

Additional advantages and benefits of the multi-model object segmentation system will become apparent in view of the following description. Further, as illustrated by the foregoing discussion, the present disclosure utilizes a variety of terms to describe the features and advantages of the multi-model object segmentation system. Before describing the multi-model object segmentation system with reference to the figures below, additional detail is now provided regarding the meaning of such terms.

As used herein, the term "digital image" (or simply "image") refers to a digital graphics file that when rendered displays one or more objects. In various implementations, images are made up of pixels that group together to form a visual representation of objects. Indeed, an image includes one or more objects associated with any suitable object type or object class. In various implementations, an image editing system displays an image on a computing device, such as a client device. In additional implementations, the image editing system enables a user to directly manipulate objects, such as move objects, duplicate objects, resize objects, and change object attributes (e.g., recolor objects).

The term "object," as used herein, refers to a visual representation of a subject, concept, or sub-concept in an image. For instance, in various implementations, an object refers to a set of pixels in an image that combines to form a visual depiction of an item, article, partial item, component, or element. In some implementations, an object corresponds to a wide range of classes and concepts. For example, objects include specialty objects, conceptual objects, objects from known-classes, and unknown object classes (e.g., objects not used in training any of the object segmentation neural networks). In some implementations, an object includes multiple instances of the object.

In one or more implementations, an object includes sub-objects, parts, or portions (i.e., partial objects). For example, the face or leg of a person are objects that are part of another object (e.g., the body of a person). As another example, a shirt is an object that is part of another object (e.g., a person). In addition, in various implementations, the term "target object" refers to an object in a digital image that is being requested by the user for segmentation and selection by the multi-model object segmentation system.

As used herein, the terms "object mask" or "segmentation mask" or "object segmentation" refer to an indication of a plurality of pixels portraying an object (e.g., an unclassified object). For example, in one or more implementations, an object mask includes a coherent region of adjoining pixels. In some implementations, an object mask includes a segmentation boundary (e.g., a boundary line or curve indicating an edge of one or more objects) or a segmentation mask (e.g., a binary mask identifying pixels corresponding to an object). Generating an object mask is sometimes referred to as "selecting" a target object (i.e., identifying pixels that represent the target object).

As used herein, the term "approximate boundary" refers to an indication of an area including an object that is larger and/or less accurate than an object mask. In one or more implementations, an approximate boundary includes at least a portion of a detected object and portions of the image not comprising the detected object. In various implementations, an approximate boundary includes any shape, such as a square, rectangle, circle, oval, or other outline surrounding an object. In one or more implementations, an approximate boundary comprises a bounding box.

As mentioned above, in various implementations, the multi-model object segmentation system employs machine-learning models and various neural networks. The term "machine learning," as used herein, refers to algorithms that model high-level abstractions in data by generating data-driven predictions or decisions from the known input data. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include latent Dirichlet allocation (LDA), multi-arm bandits models, linear regression models, logistical regression models, random forest models, support vector machines (SVG) models, neural networks (convolutional neural networks, recurrent neural networks such as LSTMs, graph neural networks, etc.), or decision tree models.

As used herein, the term "neural network" refers to a machine learning model having interconnected artificial neurons that communicate and learn to approximate complex functions and generate outputs based on a plurality of inputs provided to the model. For instance, a neural network includes an algorithm (or set of algorithms) that implements deep learning techniques that utilize a set of algorithms to model high-level abstractions in data using training data to tune parameters of the neural network. Examples of neural networks include a convolutional neural network (CNN), residual learning neural network, recurrent neural network (RNN), generative adversarial neural network (GAN), and single-shot detection (SSD) networks.

Referring now to the figures, FIG. 1 illustrates a schematic diagram of a system environment 100 in which a multi-model object segmentation system 106 operates in accordance with one or more implementations. As shown in FIG. 1, the system environment 100 (or simply "environment 100") includes a client device 102 and a server device 108 connected via a network 112. Additional detail regarding these computing devices (e.g., the client device 102 and the server device 108) is provided below in connection with FIG. 13. Further, FIG. 13 also provides additional detail regarding networks, such as the illustrated network 112.

As shown, the environment 100 includes the client device 102. In various implementations, the client device 102 is associated with a user (e.g., a user client device), such as a user that requests automatic selection of objects in a digital image. The client device 102 includes an image editing system 104 and a multi-model object segmentation system 106. In various implementations, the image editing system 104 implements the multi-model object segmentation system 106. In alternative implementations, the multi-model object segmentation system 106 is separate from the image editing system 104. While the image editing system 104 and the multi-model object segmentation system 106 are shown on the client device 102, in some implementations, the image editing system 104 and the multi-model object segmentation system 106 are located remotely from the client device 102 (e.g., on the server device 108), as further explained below.

The image editing system 104, in general, facilitates the creation, modification, sharing, and/or deletion of digital images. For instance, the image editing system 104 provides a variety of tools related to image creation and editing (e.g., photo-editing). To illustrate, the image editing system 104 provides selection tools, color correction tools, and image manipulation tools. Moreover, the image editing system 104 optionally operates in connection with one or more applications to generate or modify digital images. For example, in one or more implementations, the image editing system 104 operates in connection with digital design applications or other image editing applications.

As mentioned above, the image editing system 104 includes the multi-model object segmentation system 106. As described in detail below, the multi-model object segmentation system 106 automatically segments objects (including partial objects) in images. In particular, the multi-model object segmentation system utilizes a multi-model object segmentation framework (e.g., object segmentation pipeline) to automatically segment objects (which includes unclassified pixel clusters) in images with a high level of accuracy. For example, the multi-model object segmentation system utilizes multiple general and specialized object segmentation models to generate a combined object mask set that captures each object in an image. Then, in response to a user selection request with respect to a target object (or a target partial object), the multi-model object segmentation system utilizes a corresponding object mask to automatically select the target object (e.g., select the pixels segmented to the target object and/or deselect other pixels in the image).

As shown, the environment 100 also includes the server device 108. The server device 108 includes a multi-model object segmentation server system 110. For example, in one or more implementations, the multi-model object segmentation server system 110 represents and/or provides similar functionality as described herein in connection with the multi-model object segmentation system 106. In some implementations, the multi-model object segmentation server system 110 supports the multi-model object segmentation system 106 on the client device 102. Indeed, in one or more implementations, the server device 108 includes all, or a portion of, the multi-model object segmentation system 106. In particular, the multi-model object segmentation system 106 on the client device 102 downloads an application from the server device 108 (e.g., an image editing application from the multi-model object segmentation server system 110) or a portion of a software application.

In some implementations, the multi-model object segmentation server system 110 includes a web hosting application that allows the client device 102 to interact with content and services hosted on the server device 108. To illustrate, in one or more implementations, the multi-model object segmentation server system 110 implements the multi-model object segmentation framework, which includes various object segmentation machine-learning models. For example, the client device 102 (e.g., a mobile device) provides a digital image (e.g., via an image editing application) to the multi-model object segmentation server system 110 on the server device 108, which provides back an object mask of the target object and/or the combined object mask set for the digital image.

Although FIG. 1 illustrates a particular number, type, and arrangement of components within the environment 100, various additional environment configurations and arrangements are possible. For example, the environment 100 includes any number of client devices. As another example, the server device 108 represents a set of connected server devices. As a further example, the client device 102 may communicate directly with the server device 108, bypassing the network 112 or utilizing a separate and/or an additional network.

Figure 2:
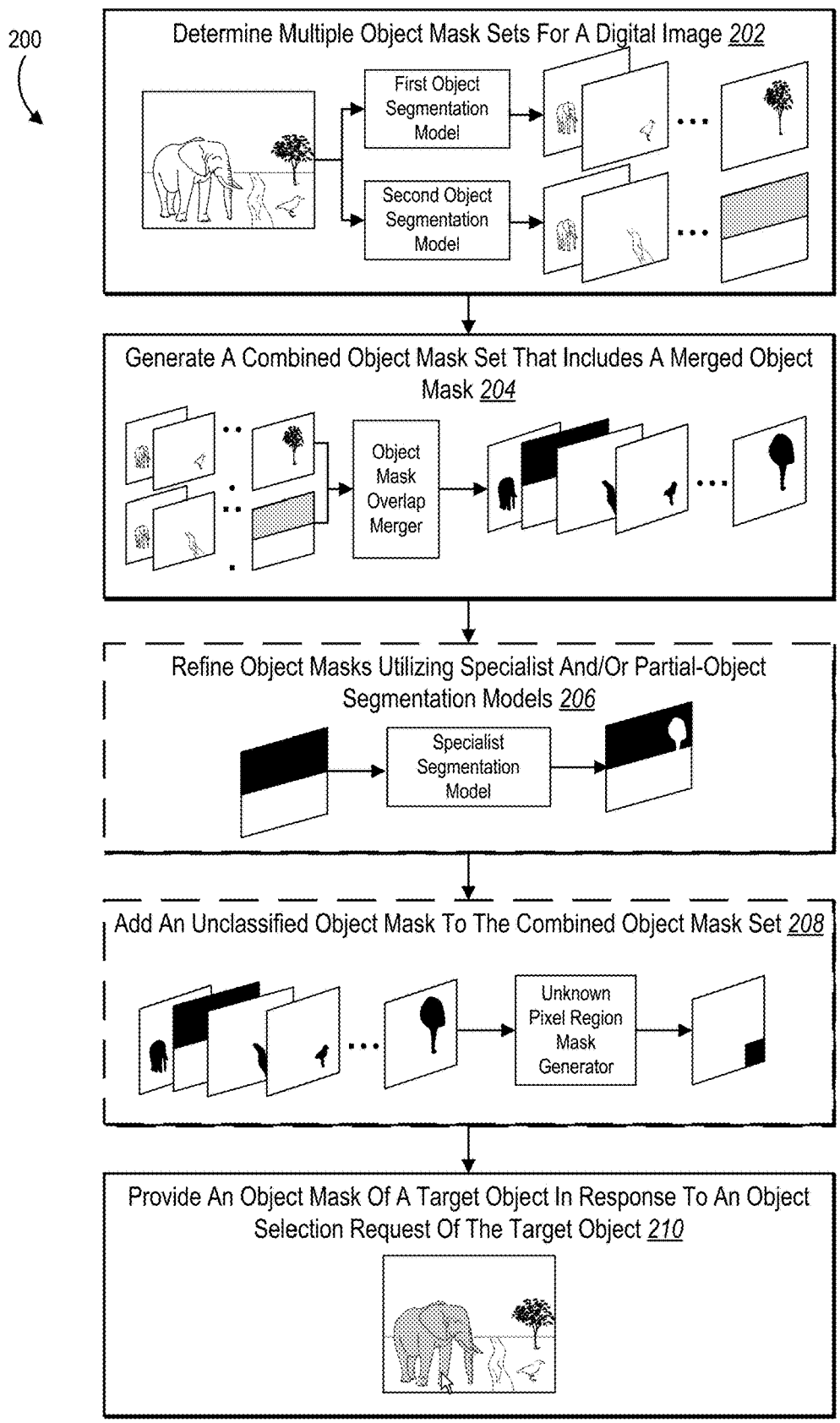
FIG. 2 illustrates an overview diagram of segmenting objects in a digital image for automatic selection in accordance with one or more implementations.

Turning to the next figure, FIG. 2 provides an overview of utilizing the multi-model object segmentation system 106 to automatically segment objects in a digital image and then provide a segmented object in response to a selection request. In particular, FIG. 2 illustrates a series of acts 200 of segmenting objects in a digital image for automatic selection in accordance with one or more implementations. For example, in various implementations, the multi-model object segmentation system 106 performs the series of acts 200 shown. In some implementations, an image editing system and/or image editing application performs one or more of the acts included in the series of acts 200.

As shown in FIG. 2, the series of acts 200 includes an act 202 of determining multiple object mask sets for a digital image. For instance, upon identifying an image to segment, the multi-model object segmentation system 106 begins processing the image within an object selection framework. For example, the multi-model object segmentation system 106 utilizes a first object segmentation model and a second object segmentation model (i.e., general object segmentation models) to each generate an object mask set of objects in the image. As shown in FIG. 2, each of the object segmentation models generates a separate object mask set. In some implementations, the multi-model object segmentation system 106 utilizes additional object segmentation models to generate additional object masks. Further detail regarding utilizing general object segmentation models to generate object mask sets is described below with respect to FIGS. 4A and 4B.

As shown, the series of acts 200 includes an act 204 of generating a combined object mask set that includes a merged object mask. For example, the multi-model object segmentation system 106 identifies one or more pairs of object masks in the different sets of object masks that overlap. For instance, as shown, both object mask sets include an object mask of an elephant. For each such object, the multi-model object segmentation system 106 then merges the pair of masks into a single object mask. In some implementations, the multi-model object segmentation system 106 first determines whether an overlap threshold is satisfied before merging an overlapping pair of object masks together.

In one or more implementations, the multi-model object segmentation system 106 generates a combined object mask set for the image. For example, the multi-model object segmentation system 106 includes each of the merged object mask set in the combined object mask set. The multi-model object segmentation system 106 also identifies and includes each non-overlapping object mask from the object mask sets. Accordingly, in various implementations, the multi-model object segmentation system 106 generates the combined object mask set as an initial object mask set for the image. Further detail regarding merging overlapping pairs of object masks and generating a combined object mask set is described below with respect to FIG. 5.

As shown, the series of acts 200 includes an optional act 206 of refining object masks utilizing specialist and/or partial-object segmentation models (e.g., specialized object segmentation models). As one example, in one or more implementations, the multi-model object segmentation system 106 determines that an object mask in the combined object mask set corresponds to a specialist object segmentation model. In these implementations, the multi-model object segmentation system 106 utilizes the specialist object segmentation model to refine the selection of the segmented object. Indeed, the multi-model object segmentation system 106 is able to employ multiple different specialist object segmentation models within the multi-model object segmentation framework to refine object masks within the combined object mask set. Additional detail regarding utilizing specialist object segmentation models is provided below with respect to FIG. 6.

As another example, in some implementations, the multi-model object segmentation system 106 determines that one or more object masks in the combined object mask set correspond to one or more partial-object segmentation models. For each of these objects, the multi-model object segmentation system 106 utilizes the corresponding partial-object segmentation model to determine object masks for partial objects within the object. For example, for the object of a body, the multi-model object segmentation system 106 utilizes a body parts segmentation model to segment sub-parts of the body. In various implementations, the multi-model object segmentation system 106 adds to the combined object mask set an associated a hierarchical relationship with the segmented object. Additional detail regarding utilizing partial-object segmentation models is provided below with respect to FIG. 7.

As shown, the series of acts 200 includes an optional act 208 of adding an unclassified object mask to the combined object mask set. In some instances, the multi-model object segmentation system 106 does not create an object mask for all pixels of an image. Accordingly, to enable user selection of all regions of the image, in various implementations, the multi-model object segmentation system 106 generates object masks for these pixel regions.

To illustrate, in one or more implementations, the multi-model object segmentation system 106 determines if a cluster of adjoining pixels that are not currently assigned to an object mask satisfy a minimal object mask threshold amount, and if so, the multi-model object segmentation system 106 creates an unclassified object mask for these pixels. As shown, FIG. 2 illustrates creating a new object mask of a pixel cluster on the bottom right of the image. The multi-model object segmentation system 106 then adds the unclassified object mask to the combined object mask set. Additional detail regarding generating unclassified object masks is provided below with respect to FIG. 8.

As shown, the series of acts 200 includes an act 210 of providing an object mask of a target object in response to an object selection request of the target object. In some implementations, the multi-model object segmentation system 106 matches the location of the selection request with an object mask in an image editing application to identify the object mask that covers the target object. In one or more implementations, the multi-model object segmentation system 106 determines that the location of the selection request corresponds to a partial object. In these implementations, the multi-model object segmentation system 106 additionally and/or alternatively selects the partial object utilizing an object mask generated for the corresponding partial object. As shown in FIG. 2, the multi-model object segmentation system 106 returns an object mask selecting the elephant in response to the user selection request. Additional examples of selecting target objects and target partial objects are described below with respect to FIGS. 10A-10D.

Figure 3:
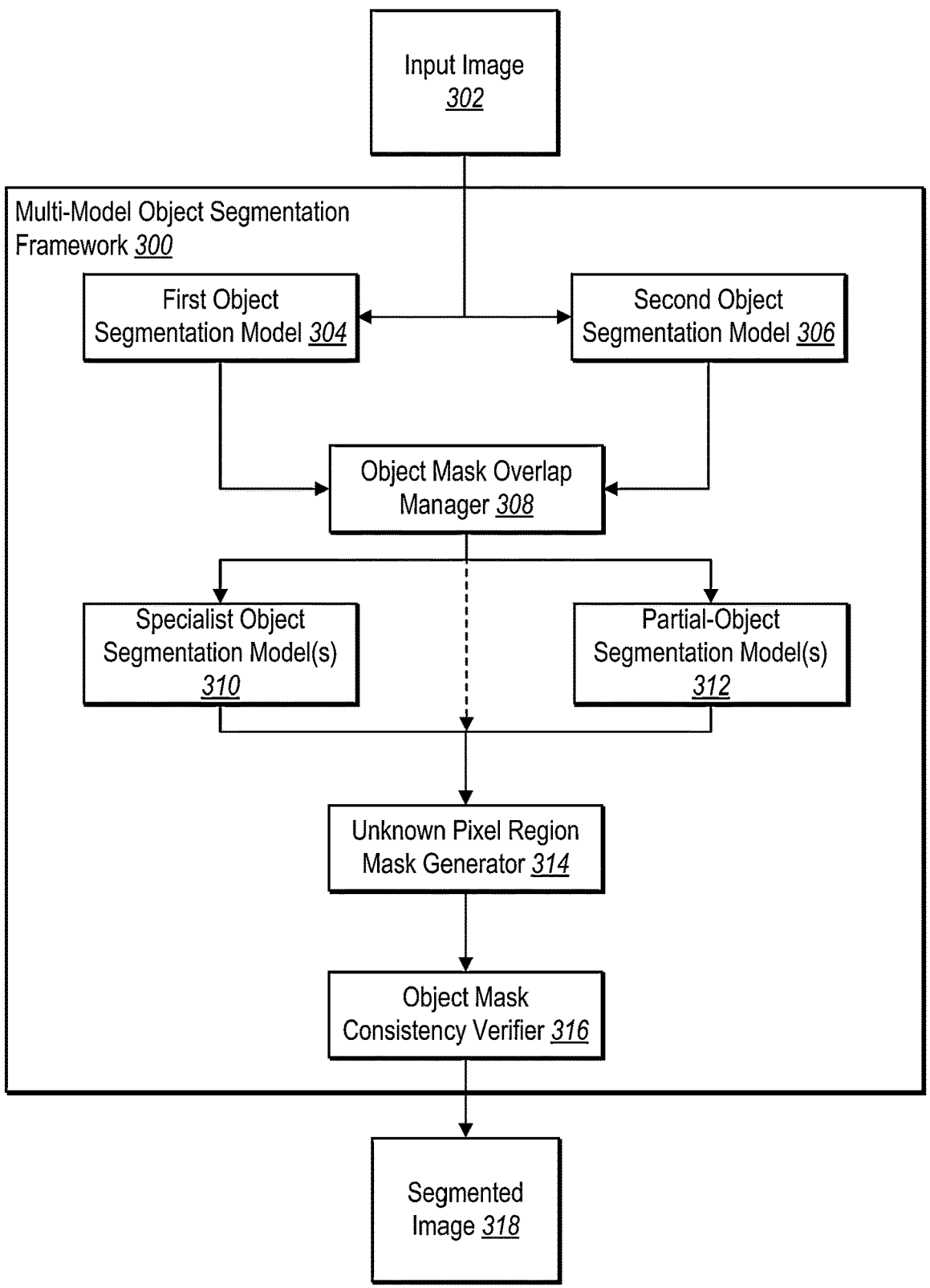
FIG. 3 illustrates a schematic diagram of a multi-model object segmentation framework for automatically segmenting objects in digital images in accordance with one or more implementations.

Turning now to FIGS. 3-9, additional detail is provided regarding the multi-model object segmentation system 106 generating and utilizing a multi-model object segmentation framework to automatically and accurately segment objects in a digital image. In particular, FIG. 3 illustrates a schematic diagram of a multi-model object segmentation framework 300 for automatically segmenting object masks for all objects in digital images in accordance with one or more implementations. FIGS. 4-9 illustrate expanded portions of the multi-model object segmentation framework 300.

As shown in FIG. 3, the multi-model object segmentation framework 300 includes multiple elements and/or components for segmenting objects in digital images. In particular, the multi-model object segmentation framework 300 includes elements and/or components for generating object masks for all objects in a digital image. Indeed, the multi-model object segmentation framework 300 provides the multi-model object segmentation system 106 with various paths for generating an accurate set of object masks as well as refining one or more object masks in the object mask set depending on what types of images are included in a digital image. For example, the elements and/or components of the multi-model object segmentation framework 300 include neural networks, machine-learning models, heuristic models, and/or functions. Further, the elements and/or components of the multi-model object segmentation framework 300 are interchangeable, removable, replaceable, and upgradable, as described below.

As illustrated, the multi-model object segmentation framework 300 begins with receiving an input image 302. In some implementations, the multi-model object segmentation system 106 obtains the input image (i.e., a digital image) from a client device. For example, the client device loads an image into an image editing application that includes the multi-model object segmentation system 106, as previously described. In general, the image includes one or more objects. For instance, the image includes background objects (i.e., scenery), foreground objects (i.e., image subjects), and/or other types of objects. In one or more implementations, the multi-model object segmentation system 106 obtains an image from another computing device or computing system.

As illustrated, the multi-model object segmentation framework 300 includes a first object segmentation model 304. In one or more implementations, the first object segmentation model 304 is a general object segmentation model that generates a first object mask set of objects in the input image 302. For example, the first object segmentation model 304 is an object segmentation machine-learning model trained to detect and classify objects corresponding to known object classes. Indeed, in various implementations, the first object segmentation model 304 is a quality-based object segmentation model that is highly accurate at classifying detected objects corresponding to a set of classes. In some implementations, however, the first object segmentation model 304 may detect fewer objects and semantic regions in the input image 302 than other object segmentation models. Further detail regarding utilizing the first object segmentation model 304 is described below with respect to FIG. 4A.

As illustrated, the multi-model object segmentation framework 300 includes a second object segmentation model 306. In one or more implementations, the second object segmentation model is a general object segmentation model that generates a second object mask set for the input image 302. For example, the second object segmentation model 306 is an object segmentation machine-learning model trained to segment semantic objects and instances of objects in a panoptic manner (e.g., identifies all foreground and background objects). In various implementations, the second object segmentation model 306 is a quantity-based object segmentation model that generally segments more objects in the input image 302 than other object segmentation models at the expense of segmenting objects in a less precise manner (e.g., masks include rough jagged lines and incorrect artifacts). Further detail regarding utilizing the second object segmentation model 306 is described below with respect to FIG. 4B.

In one or more implementations, the multi-model object segmentation framework 300 includes additional and/or different object segmentation models. For example, the multi-model object segmentation framework 300 includes more than two object segmentation models, where each model generates a set of object masks for the input image 302. Further, just as the first object segmentation model 304 and the second object segmentation model 306 use different approaches to segment objects in the input image 302, in various implementations, the additional object segmentation models employ similar or different approaches to segmenting objects in the input image 302.

As illustrated in FIG. 3, the multi-model object segmentation framework 300 includes the object mask overlap manager 308. In various implementations, the object mask overlap manager 308 detects overlap between the object mask sets. For example, in one or more implementations, the object mask overlap manager 308 utilizes classification labels and/or pixel comparisons to determine if object masks from the first and second object mask sets (and/or additional object mask sets) overlap with each other. In some implementations, the object mask overlap manager 308 merges the overlapping pair of object masks into a singled combined, merged, or modified object mask.

In additional implementations, the object mask overlap manager 308 generates a combined object mask set for the input image 302. For example, the object mask overlap manager 308 includes the merged object masks as well as non-overlapping object masks from the first and second (and/or additional) object segmentation models into a combined set of object masks for the input image 302. Further detail regarding the object mask overlap manager 308 merging overlapping pairs of object masks and generating a combined object mask set is described below with respect to FIG. 5.

As mentioned previously, the multi-model object segmentation framework 300 includes various specialized object segmentation models that refine and improve object masks in the combined object mask set. To illustrate, the multi-model object segmentation framework 300 includes one or more specialist object segmentation models 310. In general, specialist object segmentation models correspond to object segmentation models that are trained to segment a limited set of objects, but with much higher levels of precision and accuracy than general object segmentation models. While the specialist object segmentation models 310 are specialized to a smaller group of object classes, the multi-model object segmentation framework 300 may include any number of specialist object segmentation models 310.

Additionally, in various implementations, the multi-model object segmentation system 106 determines if objects in the input image 302 correspond to one of the specialist object segmentation models 310 (e.g., specialized object segmentation models). In these implementations, the multi-model object segmentation system 106 utilizes the corresponding specialist object segmentation models 310 to more precisely identify the object in the input image 302. In one or more implementations, the multi-model object segmentation system 106 updates the combined object mask set with the object mask generated by the specialist object segmentation models 310. Further detail regarding utilizing specialist object segmentation models is provided below with respect to FIG. 6.

As illustrated, the multi-model object segmentation framework 300 includes one or more partial-object segmentation models 312 (e.g., specialized object segmentation models). In many instances, an object is able to be broken down into sub-parts (i.e., partial objects). Accordingly, in various implementations, the multi-model object segmentation system 106 determines if a partial-object segmentation model 312 is able to further separate an object into more specific parts. If so, the multi-model object segmentation system 106 utilizes a partial-object segmentation model 312 to generate a subset of object masks that correspond to the objects and adds the subset to the combined object mask set.

As with the specialist object segmentation models 310, the multi-model object segmentation framework 300 may include numerous different partial-object segmentation models 312, each corresponding to different object types and classes. Further, in one or more implementations, the partial-object segmentation models 312 is associated with an object hierarchy manager, which manages permittable overlapping object masks when a hierarchical relationship exists. Additional detail regarding utilizing partial-object segmentation models is provided below with respect to FIG. 7.

As illustrated, the multi-model object segmentation system 106 may utilize the one or more specialist object segmentation models 310, the one or more partial-object segmentation models 312, or neither (shown as the dashed line). Indeed, the multi-model object segmentation system 106 determines whether further refinement is available based on the type of objects in the input image 302. When an object matches a specialized object segmentation model, the multi-model object segmentation system 106 utilizes the corresponding specialized object segmentation model to generate a more precise object mask of the object. In this manner, the multi-model object segmentation system 106 efficiently uses only the object segmentation models in the multi-model object segmentation framework 300 that improve the accuracy of the combined object mask set. Stated differently, the multi-model object segmentation system 106 does not waste computing resources by running one or more of the specialized object segmentation models that do not correspond to objects within the input image 302, and thus, yield no improved results.

As illustrated, the multi-model object segmentation framework 300 includes the unknown pixel region mask generator 314. In various implementations, the unknown pixel region mask generator 314 generates object masks for pixel clusters in the input image 302 that are otherwise unsegmented. In one or more implementations, the unknown pixel region mask generator 314 determines if a cluster of adjoining unclassified pixels satisfies a minimal object mask threshold amount. If the threshold is satisfied, in some implementations, the unknown pixel region mask generator 314 generates an unclassified object mask for the pixel cluster. Additional detail regarding generating unclassified object masks is provided below with respect to FIG. 8.

Additionally, as illustrated, the multi-model object segmentation framework 300 includes an object mask consistency verifier 316. In various implementations, the object mask consistency verifier 316 performs one or more actions that ensure accuracy and consistency in the combined object mask set. For example, in some implementations, the object mask consistency verifier 316 identifies and cures pixels in the input image 302 assigned to multiple object masks. In some implementations, the object mask consistency verifier 316 performs additional finishing actions, as described below. Additional detail regarding the object mask consistency verifier 316 is provided below with respect to FIG. 9.

In one or more implementations, the multi-model object segmentation system 106 flows through the operations of the multi-model object segmentation framework 300 as shown. In alternative implementations, the multi-model object segmentation system 106 performs many of the operations in parallel and/or in a different order. For example, the multi-model object segmentation system 106 determines the first and second object mask sets in parallel. Further, in some implementations, the multi-model object segmentation system 106 utilizes the object mask overlap manager 308, the specialist object segmentation model(s) 310, and/or the partial-object segmentation model(s) 312 in parallel. In various implementations, utilizing multiple components in parallel improves utilization efficiency on a host computing device and improves the overall efficiency of the system.

Lastly, as shown in FIG. 3, the multi-model object segmentation framework 300 outputs a segmented image 318. For example, in various implementations, the segmented image 318 includes the input image 302 joined with the combined object mask set. Indeed, the multi-model object segmentation system 106 generates the combined object mask set such that each object and region in the input image 302 is selectable with a corresponding object mask (e.g., the segmented image 318). Indeed, unlike conventional object segmentation systems, each object and region in the input image 302 is selectable. Further, unlike conventional object segmentation systems, the selections of each object and region in the input image 302 are highly accurate, refined, and precise.

Furthermore, the multi-model object segmentation system 106 optionally preemptively generates the segmented image 318. In this manner, the multi-model object segmentation system 106 is able to return an object mask in response to any selection request. More specifically, by preemptively segmenting all object (and optionally object parts), the multi-model object segmentation system 106 can quickly return an object mask for any selected object or object part. In other words, the multi-model object segmentation system 106 utilizes the pre-emptive segmentation for any subsequent object selection requests without having to reprocess the input image. Thus, the multi-model object segmentation system 106 both increases efficiency and reduces processing time.

Turning now to the next set of figures, FIGS. 4A-4B illustrate block diagrams of utilizing various object segmentation models utilized to generate object mask sets for a digital image in accordance with one or more implementations. In particular, FIG. 4A shows an implementation of the first object segmentation model 304 introduced above in the multi-model object segmentation framework 300. FIG. 4B shows an implementation of the second object segmentation model 306 from the multi-model object segmentation framework 300.

As illustrated, FIG. 4A includes the first object segmentation model 304 generating a classified object mask set 408 (i.e., the first object mask set) from an input image 302. In various implementations, the first object segmentation model 304 includes a machine-learning model, such as one or more machine-learning models described above. In further implementations, the first object segmentation model 304 includes a neural network. For example, as shown, the first object segmentation model 304 includes an object detection neural network 410 and an object mask generator neural network 418. In some implementations, the object mask generator neural network 418 is incorporated into the object detection neural network 410.

In one or more implementations, the multi-model object segmentation system 106 learns parameters for the object detection neural network 410 so the object detection neural network 410 will accurately detect objects corresponding to known object classes. For example, in various implementations, the multi-model object segmentation system 106 trains the object detection neural network 410 to recognize hundreds (or tens or thousands) of object classes. In some implementations, the object detection neural network 410 is a CNN (e.g., an R-CNN or a Faster R-CNN).

As shown, the object detection neural network 410 includes an encoder 412 and a decoder 416. In various implementations, the encoder 412 encodes the input image 302 into latent object classification feature vectors 414 (or simply "classification feature vectors" 414) that associates objects in the input image 302 with potential objects within multi-dimensional vector space. For example, in one or more implementations, the encoder 412 processes the input image 302 through various neural network layers (e.g., convolutional, ReLU, and/or pooling layers) to encode pixel data from the input image 302 into a classification feature vector 414 (e.g., a string of numbers in multi-dimensional vector space representing the encoded image data).

As shown, the object detection neural network 410 includes higher neural network layers that form a decoder 416. In one or more implementations, the higher neural network layers include fully connected layers. In various implementations, the decoder 416 processes the classification feature vectors 414 to generate bounding boxes and/or pixel segmentations for each detected object in an input image. For example, the decoder 416 generates the classified object mask set 408 from the classification feature vector 414 (e.g., using a SoftMax classifier) for each object in the input image 302.

As mentioned above, in some implementations, the object detection neural network 410 generates bounding boxes for each classified object in the input image 302. For example, the object detection neural network 410 creates an approximate boundary around each detected known object. Indeed, in various implementations, the object detection neural network 410 generates multiple bounding boxes that each indicate an object in the input image 302 that could correspond to an object.

Further, in example implementations, the object detection neural network 410 labels each of the known objects with an object class. For instance, the object detection neural network 410 tags each bounding box with a prediction of one or more known objects identified within the bounding box. In some implementations, the classification label includes known object segmentation confidence scores (e.g., prediction probability scores) for each of the object tags predicted for a boundary box. In some implementations, the object detection neural network 410 generates a list of detected known objects and their corresponding labels to indicate what objects have been detected in the image.

In various implementations, the object detection neural network 410 corresponds to one or more deep neural networks or models that detect objects of known object classes. For example, the object detection neural network 410 comprises one of the model or neural networks described in U.S. patent application Ser. No. 16/388,115, entitled "Robust Training of Large-Scale Object Detectors with Noisy Data," filed on Apr. 8, 2019; U.S. patent application Ser. No. 16/518,880, entitled "Utilizing Multiple Object Segmentation Models To Automatically Select User-Requested Objects In Images," filed on Jul. 22, 2019; or U.S. patent application Ser. No. 16/817,418, entitled "Utilizing A Large-Scale Object Detector To Automatically Select Objects In Digital Images," filed on Mar. 20, 2020; the contents of each of which are incorporated herein by reference in their entirety.

As mentioned above, in various implementations, the object detection neural network 410 includes the object mask generator neural network 418. In one or more implementations, the object mask generator neural network 418 generates object masks based on the output of the object detection neural network 410. For example, in some implementations, the object detection neural network 410 provides bounding boxes of detected objects (as described above) to the object mask generator neural network 418, which generates the classified object mask set 408 for the input image 302.

In generating an object mask for a detected object, the object mask generator neural network 418 is able to segment the pixels in the detected query object from the other pixels in the image. For example, the object mask generator neural network 418 creates a separate image layer that sets the pixels corresponding to each detected object to positive (e.g., binary 1) while setting the remaining pixels in the image to a neutral or negative (e.g., binary 0). When an object mask layer for a target object is combined with the input image 302, only the pixels of the target object are visible. Indeed, the generated object mask facilitates the automatic selection of target objects within the input image 302.

In various implementations, the object mask generator neural network 418 corresponds to one or more deep neural networks or models that select an object based on bounding box parameters corresponding to the object within an image. For example, in one or more implementations, the object mask generator neural network 418 utilizes the techniques and approaches found in Ning Xu et al., "Deep GrabCut for Object Selection," published Jul. 14, 2017, the entirety of which is incorporated herein by reference. As another example, the object mask neural network utilizes the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; or U.S. Pat. No. 10,192,129, "Utilizing Interactive Deep Learning To Select Objects In Digital Visual Media," filed Nov. 18, 2015, each of which is incorporated herein by reference in their entirety.

As illustrated, FIG. 4B includes the second object segmentation model 306 generating a panoptic object mask set 428 (i.e., the second object mask set) from an input image 302. In various implementations, the second object segmentation model 306 includes a machine-learning model, such as one or more machine-learning models described above. In further implementations, the second object segmentation model 306 includes a neural network. To illustrate, the first object segmentation model 304 includes a panoptic object segmentation neural network 420.

As with the object detection neural network 410, in various implementations, the multi-model object segmentation system 106 trains the panoptic object segmentation neural network 420 to generate the panoptic object mask set 428 from the input image 302. In alternative implementations, the multi-model object segmentation system 106 obtains a pre-trained object detection neural network 410 and/or panoptic object segmentation neural network 420. In any case, the multi-model object segmentation system 106 may further train the object detection neural network 410 and/or panoptic object segmentation neural network 420 as additional training data becomes available to further improve the accuracy of these models.

In general, the panoptic object segmentation neural network 420 attempts to segment each pixel in the input image 302 into an object mask (optionally with labels). Accordingly, the panoptic object segmentation neural network 420 is able to segment most if not all objects in an image. However, in some instances, while the number of segmented objects is high, the ability to accurately segment an object is lower, as described above.

As shown, the panoptic object segmentation neural network 420 includes an instance segmentation model 422. In various implementations, the instance segmentation model 422 segments quantifiably objects (e.g., "thing" objects) in digital images, such as cars, people, trees, sports equipment, and buildings. Indeed, the instance segmentation model 422 segments objects in the input image 302 that have instance-level classifications (e.g., labels). In one or more implementations, the instance segmentation model 422 utilizes a feature pyramid network architecture (e.g., FPN).

In some implementations, the semantic segmentation model 424 segments non-quantifiable objects (e.g., "stuff" objects) in digital images, such as road, sky, water, and ground. In these implementations, the semantic segmentation model 424 segments objects in the input image 302 that do not have instance-level classifications but rather semantic-level classifications. For example, in various implementations, the semantic segmentation model 424 classifies all people in an image as belonging to the same people classification (e.g., it does not separate each instance of a detected person). In one or more implementations, the semantic segmentation model 424 utilizes a convolutional neural network architecture (e.g., Mask R-CNN).

In many implementations, the panoptic object segmentation neural network 420 utilizes both the instance segmentation model 422 and the semantic segmentation model 424 to generate the panoptic object mask set 428. For example, the panoptic object segmentation neural network 420 unifies the segmentation schemes to generate object masks for each instance of an object. Accordingly, the panoptic object segmentation neural network 420 generates the panoptic object mask set 428 to include object masks for objects in the input image 302 along with corresponding object classifications. In various implementations, the panoptic object segmentation neural network 420 utilizes the techniques and approaches found in U.S. Patent Application Publication No. 2018/0108137, "Instance-Level Semantic Segmentation System," filed on Oct. 18, 2016; or Alexander Kirillov et al., "Panoptic Feature Pyramid Networks," in *CVPR* 2019, each of which is incorporated herein by reference in their entirety.

Figure 5:
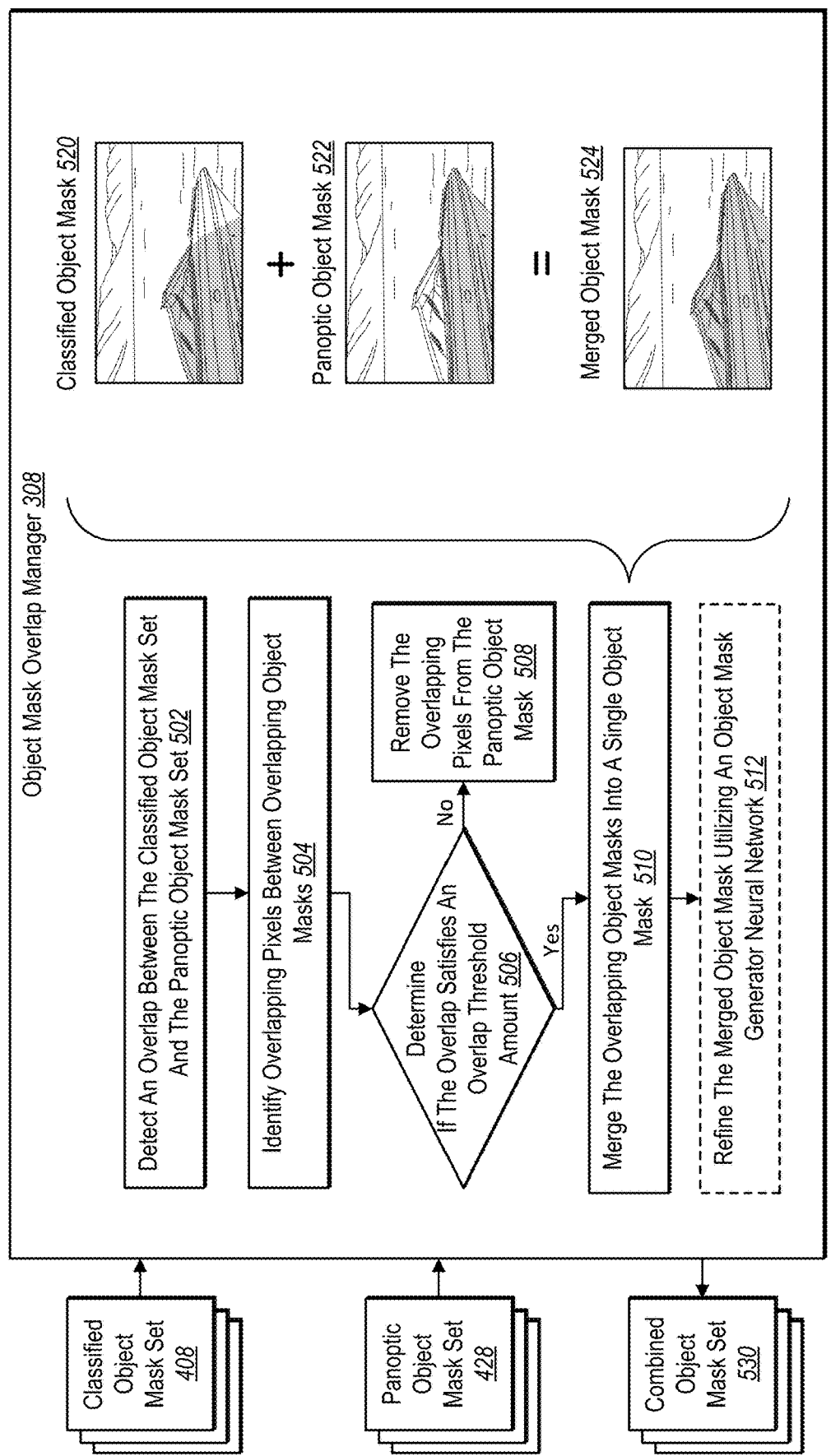
FIG. 5 illustrates a block diagram of generating a combined object mask set for a digital image based on merging overlapping object masks in accordance with one or more implementations.

Turning now to FIG. 5, a block diagram of the object mask overlap manager 308 generating a combined object mask set for a digital image based on merging overlapping object masks in accordance with one or more implementations is illustrated. As shown, FIG. 5 includes the object mask overlap manager 308, the classified object mask set 408, the panoptic object mask set 428, and a combined object mask set 530. While FIG. 5 is described in terms of classified object mask set 408 and the panoptic object mask set 428, the actions in FIG. 5 apply to any two or more object mask sets.

In one or more implementations, upon generating the classified object mask set 408, the panoptic object mask set 428, and/or any additional initial object mask sets, the multi-model object segmentation system 106 refines the object mask sets to generate a combined and/or modified object mask set. For example, as shown in the multi-model object segmentation framework 300 above, the multi-model object segmentation system 106 provides the object mask sets to the object mask overlap manager 308 to begin refining the segmented objects in the input image 302.

As shown, the object mask overlap manager 308 includes a flowchart of various acts 502-512 that are performed by the multi-model object segmentation system 106. As illustrated in the object mask overlap manager 308, the multi-model object segmentation system 106 performs an act 502 of detecting an overlap between masks of the classified object mask set 408 and the panoptic object mask set 428. For example, in one or more implementations, the multi-model object segmentation system 106 compares (when available) classification labels between the two object mask sets to determine whether the two object mask sets segmented one or more of the same objects. For instance, the multi-model object segmentation system 106 determines that both object mask sets include a duplicate object mask with the classification label "boat."

As shown in the object mask overlap manager 308, the multi-model object segmentation system 106 performs an act 504 of identifying overlapping pixels between overlapping object masks. For example, in various implementations, the multi-model object segmentation system 106 determines one or more pairs of overlapping object masks based on overlapping pixels. For instance, in one or more implementations, the multi-model object segmentation system 106 compares pixels in object masks of the classified object mask set 408 to each object mask in the panoptic object mask set 428 (or vice versa) to determine if pixel overlap exists. In some implementations, the multi-model object segmentation system 106 limits the comparison to object masks in the two object mask sets that include the same classification label (e.g., compares object mask set with the boat classification label).

In one or more implementations, the multi-model object segmentation system 106 determines locations of the classified object mask set 408 and the panoptic object mask set 428. When pixels of an object mask from one object mask set overlap with pixels of an object mask from the other object mask set, the multi-model object segmentation system 106 creates an overlapping object mask pair. For example, the multi-model object segmentation system 106 designates the object masks with the same pixel as an overlapping object mask pair.

As shown in the object mask overlap manager 308, the multi-model object segmentation system 106 performs an act 506 of determining if an overlapping object mask pair satisfies an overlap threshold amount. In various implementations, the multi-model object segmentation system 106 compares the location of all pixels in each object mask in the overlapping object mask pair to determine to what extent the object masks overlap. For example, the multi-model object segmentation system 106 determines whether one object mask overlaps with the paired object mask by an overlap threshold amount.

In one or more implementations, the overlap threshold amount corresponds to a ratio of a first number of pixels in one object mask to a second number of pixels in the second object mask. For example, the overlap threshold amount is satisfied when 50%, 80%, or 95% of pixels overlapping from one object mask overlaps with the paired object mask. For instance, if a first object mask is fully enclosed by the second paired object mask, then 100% of the pixels of the first object mask would overlap with the second object mask (while the second object mask has less than 100% of its pixels overlapping with the first object mask as it is larger). In some implementations, the overlap threshold amount is a fixed number of pixels (e.g., 100 or more pixels) or a percentage of the total number of pixels in the input image (e.g., 2% pixel overlap).

When the overlap threshold amount is not satisfied, the multi-model object segmentation system 106 may unpair the two overlapping object masks. To illustrate, as shown in the object mask overlap manager 308, when the determination is "no," the multi-model object segmentation system 106 performs an act 508 of removing the overlapping pixels from the panoptic object mask. In alternative implementations, the multi-model object segmentation system 106 removes the overlapping pixels from the classification object mask.

In one or more implementations, when the overlap threshold amount is not satisfied, the multi-model object segmentation system 106 assigns the overlapping pixels to either the panoptic object mask or the classification object mask based on one or more factors. For instance, the multi-model object segmentation system 106 utilizes an algorithm that determines a correspondence score between the overlapping pixels and both the panoptic object mask and the classification object mask based on comparing pixel attributes (e.g., color and/or distance) of the overlapping pixels to pixels in each object mask. For example, the multi-model object segmentation system 106 assigns the overlapping pixels object mask with the higher correspondence score.

In another instance, the multi-model object segmentation system 106 assigns the overlapping pixels to either the panoptic object mask or the classification object mask based on a resulting edge efficiency metric. In one or more implementations, the multi-model object segmentation system 106 determines how adding the overlapping pixels (or a portion thereof) to each of the object masks affects the outer edge of the object mask, such whether adding the overlapping pixels would create a smooth edge or would jaggedly protrude. In these implementations, the multi-model object segmentation system 106 joins the overlapping pixel to the object mask that creates the smoother edge. In some implementations, the multi-model object segmentation system 106 splits the overlapping pixels if doing so would improve the edge efficiency of both the panoptic object mask and the classification object mask object masks. In various implementations, the multi-model object segmentation system 106 utilizes a combination of pixel attribute matching and edge efficiency to determine to which object mask to assign the overlapping pixels.

If, however, the multi-model object segmentation system 106 determines that the overlap threshold amount is satisfied, the multi-model object segmentation system 106 may combine the overlapping object mask pair. To illustrate, as shown in the object mask overlap manager 308, the multi-model object segmentation system 106 performs an act 510 of merging the overlapping object masks into a single object mask. In one or more implementations, the multi-model object segmentation system 106 merges the two object masks by adding the overlapping pixels as well as any non-overlapping pixels from both object masks into a single combined object mask.

In some implementations, the multi-model object segmentation system 106 removes the pixels from the object mask that has a lower amount of overlap. For example, the multi-model object segmentation system 106 modifies the object mask of the smaller overlapping object mask until the object mask set no longer shares overlapping pixels. In one or more implementations, the multi-model object segmentation system 106 addresses the issue of overlapping pixels at a later stage, as described below with respect to the object mask consistency verifier and FIG. 9.

To illustrate, FIG. 5 includes a classified object mask 520, a panoptic object mask 522, and a merged object mask 524. As shown, each of these object masks corresponds to the input image of a boat in the water and mountains in the background. In the top image, the classified object mask 520 covers the boat except for the bow (e.g., front). In the middle image, the panoptic object mask 522 covers the body of the boat but not the windshield portion (e.g., top). Accordingly, by merging the classified object mask 520 and the panoptic object mask 522, the multi-model object segmentation system 106 generates the merged object mask 524, which covers all portions of the boat.

In one or more implementations, the multi-model object segmentation system 106 merges the overlapping object masks into a single object mask by modifying one object mask with the other object mask in the overlapping pair. For example, the multi-model object segmentation system 106 identifies a set of non-overlapping pixels in the first object mask that is non-overlapping with the second object mask from the second set of object masks. The multi-model object segmentation system 106 then modifies the second object mask by adding the set of non-overlapping pixels from the first object mask to the pixels included in the second object mask. In these implementations, the multi-model object segmentation system 106 modifies a first object mask set by supplementing it with overlapping object masks for a second object mask set (or vice versa).

In some implementations, the object mask overlap manager 308 includes one or more additional actions. For instance, as shown in, the multi-model object segmentation system 106 performs an optional act 512 of refining the merged object mask utilizing an object mask generator neural network. For example, in one or more implementations, the multi-model object segmentation system 106 provides the merged object mask to the object mask generator neural network described above, which refines the segmentation of the detected object.

In various implementations, the object mask generator neural network adds missing portions of a detected object based on the merged object mask. For instance, while both object masks for an overlapping object mask pair do not fully segment an object in the input image, when combined, the merged object mask forms a better boundary approximation of the object. In these implementations, the object mask generator neural network utilizes the merged object mask to accurately detect the boundaries of the object by including pixels that were previously missing. Similarly, in some implementations, the object mask generator neural network removes artifacts included in the merged object mask. For example, if one of the object masks from the overlapping object mask pair includes pixels located outside of a detected object, the object mask generator neural network utilizes the approximate boundary of the merged object mask to accurately detect the boundaries of the object by removing these inaccurate pixels.

In various implementations, the multi-model object segmentation system 106 repeats the actions 502-512 of the object mask overlap manager 308 for each overlapping object mask pair. Indeed, in one or more implementations, the multi-model object segmentation system 106 merges, combines, and/or modifies object masks in the object mask sets to generate multiple merged object masks. The multi-model object segmentation system 106 may store the merged object masks in either the object mask set or a new object mask set. For example, in some implementations, the multi-model object segmentation system 106 replaces overlapping object masks in a first object mask set with the corresponding merged (e.g., modified) object masks.

As mentioned above, in several implementations, the multi-model object segmentation system 106 generates a new object mask set for the merged object masks. For example, the multi-model object segmentation system 106 generates a combined object mask set 530 that includes the merged object masks as well as any non-overlapping (or non-paired) object masks for the classified object mask set 408 and panoptic object mask set 428. In this manner, not only does the combined object mask set 530 include objects not segmented by one or more of the object segmentation models, in many implementations, the combined object mask set 530 includes highly accurate and refined object masks for many of the segmented objects in the input image (e.g., via the merged object mask set).

In one or more implementations, the multi-model object segmentation system 106 further refines one or more object mask sets in the combined object mask set 530. For example, for non-overlapping and/or unpaired object masks added from the panoptic object mask set 428, the multi-model object segmentation system 106 refines these object masks utilizing the object mask generator neural network. As described above, the object mask generator neural network often improves the segmentation of an object. Accordingly, in some implementations, the multi-model object segmentation system 106 processes each (or at least many) of the object masks in the combined object mask set 530 utilizing the object mask generator neural network at some point within the object mask overlapping manager 308.

FIG. 5 and the identified corresponding figures describe various embodiments of the object mask overlap manager 308. Accordingly, the actions and algorithms described in connection with FIG. 5 and previously identified figures (e.g., FIGS. 3, 4A, and 4B) provide example structure and architecture for performing a step for generating a set of object masks comprising an object mask for each of the plurality of objects in the digital image utilizing a plurality of competing object segmentation machine-learning models. Indeed, the description, block diagrams, and charts described in connection with FIGS. 3, 4A, 4B, and 5 provide structure for one or more of the algorithms corresponding to the multi-model object segmentation system 106 and the object mask overlap manager 308.

As described above, in various implementations, upon generating the combined object mask set 530, the multi-model object segmentation system 106 further refines one or more object masks within the combined object mask set 530. As mentioned above with respect to the multi-model object segmentation framework 300, the multi-model object segmentation system 106 may utilize one or more specialist object segmentation models 310 as well as one or more partial-object segmentation models 312 to refine an object mask. Accordingly, FIGS. 6-7 provide additional detail regarding these specialized object segmentation models.

Figure 6:
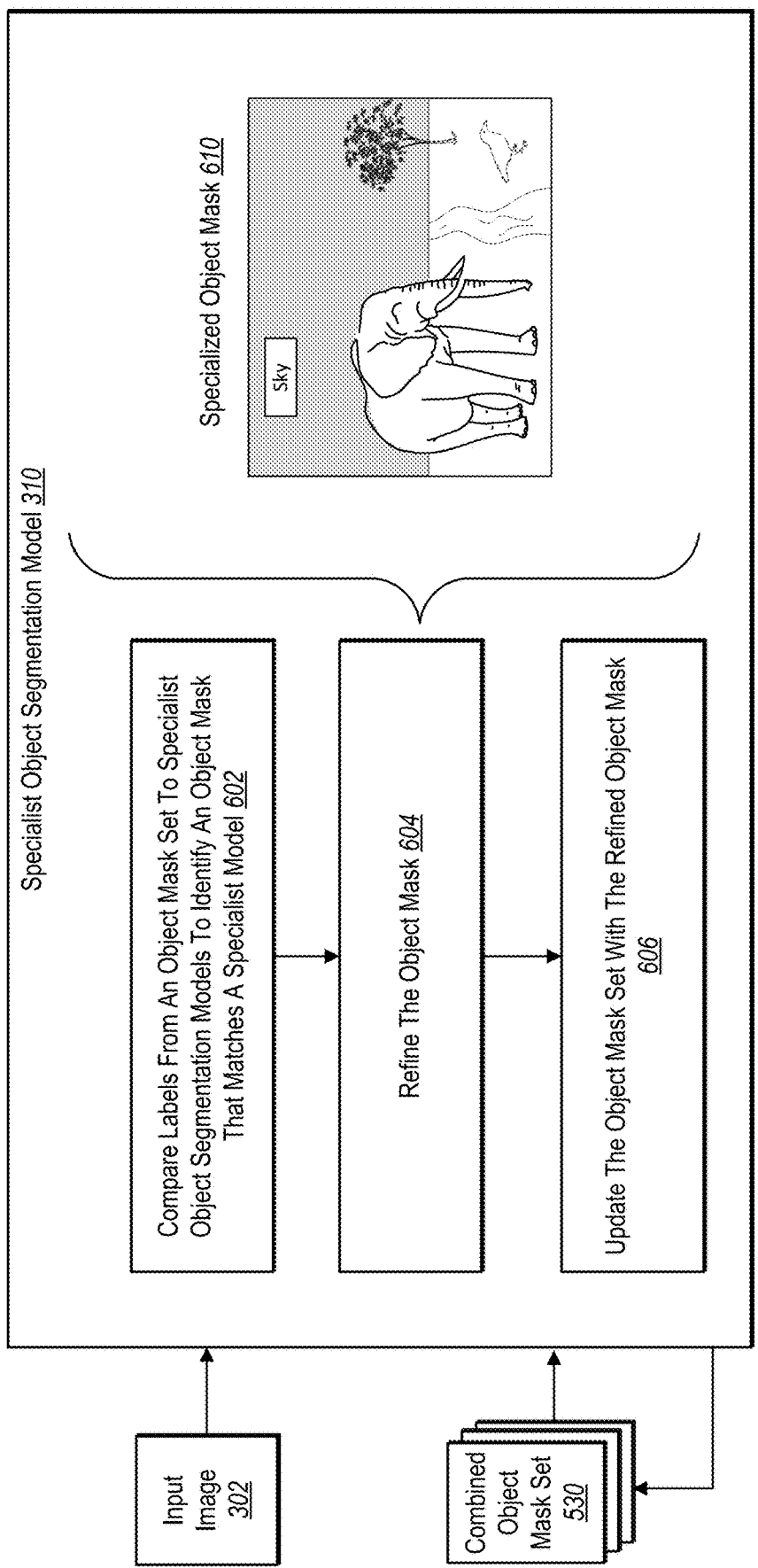
FIG. 6 illustrates a block diagram of utilizing one or more specialist object segmentation models to refine object masks in accordance with one or more implementations.
Figure 7:
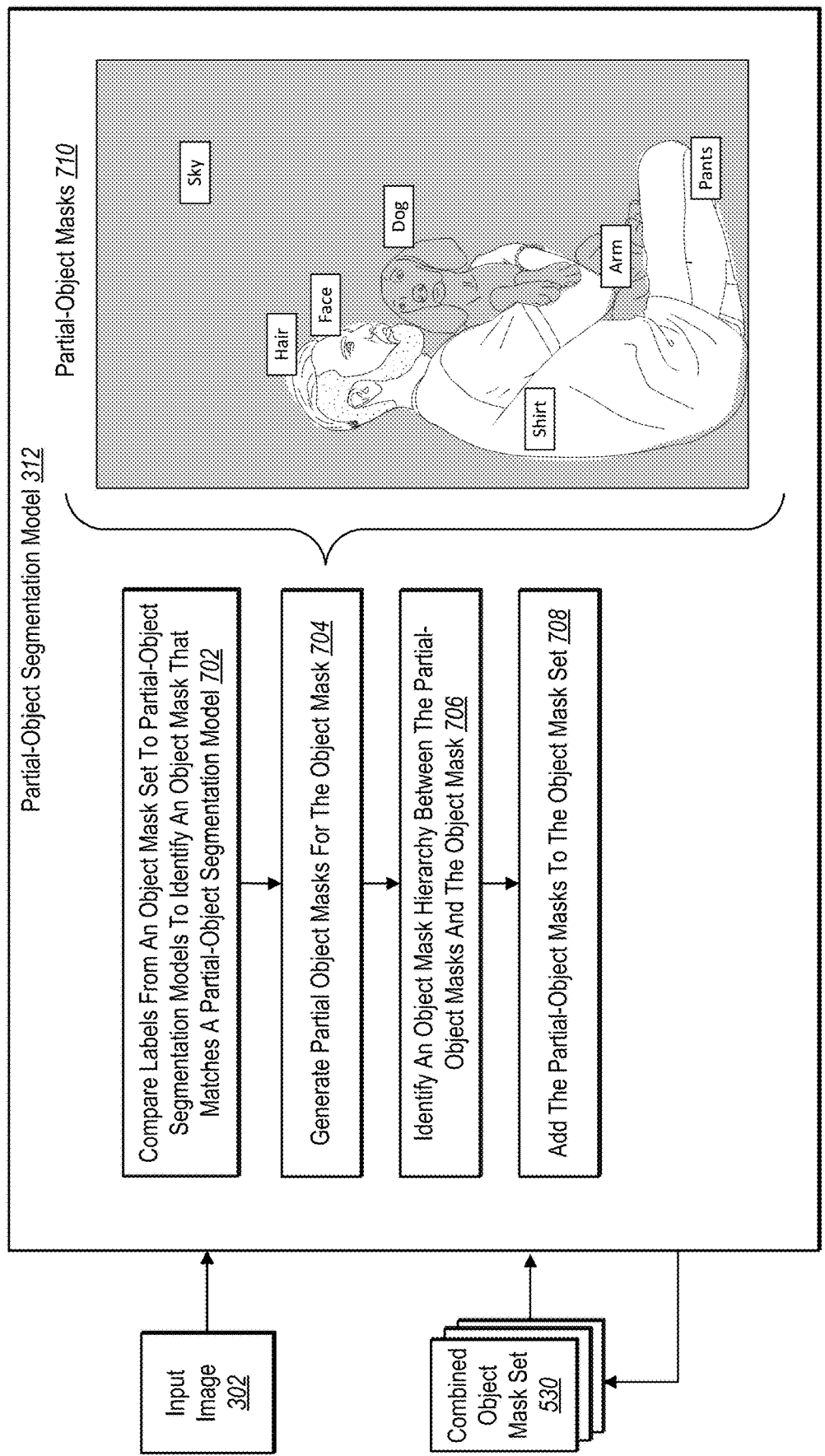
FIG. 7 illustrates a block diagram of utilizing one or more partial-object segmentation models to generate improved object masks for a digital image in accordance with one or more implementations.

To illustrate, FIG. 6 shows a block diagram of utilizing one or more specialist object segmentation models to refine object masks in accordance with one or more implementations. As shown, FIG. 6 includes the specialist object segmentation model 310, the input image 302, and the combined object mask set 530. Each of these components is introduced above.

In various implementations, the specialist object segmentation model 310 represents a specialist object segmentation neural network (or simply "specialist network") that is trained to segment a particular object type or object class. Accordingly, a specialist network often generates the most accurate object mask possible for a particular type of object for which it is trained. Often, the number of specialist networks is limited; accordingly, the multi-model object segmentation system 106 is able to quickly determine whether an object mask is refinable by one of the specialist networks. Examples of specialist object segmentation neural networks include, but are not limited to, specialist networks that segment the sky, water, roads, bodies and skin, clothing, faces, or waterfalls. Additionally, while the specialist object segmentation model 310 is described in terms of a specialist object segmentation neural network, in alternative implementations, the specialist object segmentation model 310 corresponds to other types of machine-learning models.

As shown, the specialist object segmentation model 310 includes a flowchart of various acts 602-606 that the multi-model object segmentation system 106 performs. For example, as illustrated in the specialist object segmentation model 310, the multi-model object segmentation system 106 performs an act 602 of comparing labels from an object mask set to specialist object segmentation models to identify an object mask that matches a specialist model. For instance, in many implementations, the multi-model object segmentation system 106 compares the classification labels of the combined object mask set 530 to a specialist classification table or list, which indicates whether the object classification of an object corresponds to a specialist network.

In some implementations, if upon comparing classification labels of the combined object mask set 530 to the specialist networks, the multi-model object segmentation system 106 does not determine a match, the multi-model object segmentation system 106 skips utilizing a specialist network. In this manner, the multi-model object segmentation system 106 does not waste computing resources on the input image 302 attempting to segment an object that is not present. Indeed, the multi-model object segmentation system 106 improves efficiency by utilizing a specialist network only when invoking the specialist network will improve the accuracy of an object mask in the combined object mask set 530.

As shown in the specialist object segmentation model 310, the multi-model object segmentation system 106 performs an act 604 of refining the object mask. In some implementations, the multi-model object segmentation system 106 provides the input image 302 and the matching object mask of the object to the specialist object segmentation model 310 for refinement. In these implementations, the specialist object segmentation model 310 (e.g., the specialist network) utilizes these inputs to generate a refined object mask of the object. For example, if there exist multiple instances of the object, the specialist network utilizes the object mask to identify the particular instance to detect, segment, and update.

In various implementations, the multi-model object segmentation system 106 provides the input image 302 to the specialist network without additional input. In many instances, because the special network is trained to segment a particular class of objects, the specialist network is able to segment the object based on the input image 302. To illustrate, FIG. 6 shows an example image (e.g., an input image) on the right of a savanna with animals. Upon providing this input image to a sky specialist object segmentation neural network, the specialist network segments the sky in a specialized object mask 610.

As shown in the specialist object segmentation model 310, the multi-model object segmentation system 106 performs an act 606 of updating the object mask set with the refined object mask. For example, in one or more implementations, the multi-model object segmentation system 106 updates the combined object mask set 530 with the refined object mask (e.g., the specialized object mask 610). In some implementations, the multi-model object segmentation system 106 updates the combined object mask set 530 by replacing the object mask with the refined object mask. In some implementations, the multi-model object segmentation system 106 updates the combined object mask set 530 by merging the object mask with the refined object mask.

In various implementations, the multi-model object segmentation system 106 repeats the actions 602-606 for each object mask in the combined object mask set 530 that match with a specialist network. In this manner, for each segmented object in the input image 302 that corresponds to a specialist network, the multi-model object segmentation system 106 refines the object mask to the most accurate object mask possible.

As mentioned above, the multi-model object segmentation framework 300 includes any number of specialist networks. In various implementations, the multi-model object segmentation system 106 adds additional specialist networks to the multi-model object segmentation framework 300 as the need for additional specialist networks is identified. Similarly, in one or more implementations, the multi-model object segmentation system 106 replaces, updates, and/or modifies a specialist network in the multi-model object segmentation framework 300. In particular, the multi-model object segmentation system 106 is able to add, remove, or modify specialist networks to and from the multi-model object segmentation framework 300 without modifying, retraining, or reconfiguring other parts of the multi-model object segmentation framework 300.

As mentioned above, the multi-model object segmentation system 106 utilizes a specialist network to segment particular objects within an image in various implementations. As also mentioned, an example of a specialist network includes an object segmentation neural network trained to segment the sky within an image. For example, the multi-model object segmentation system 106 utilizes the techniques, approaches, and/or specialist networks described in "Utilizing Multiple Object Segmentation Models To Automatically Select User-Requested Objects In Images," filed on Jul. 22, 2019; Yi-Hsuan Tsai et al., "Sky is Not the Limit: Semantic-Aware Sky Replacement," *ACM Transactions on Graphics (SIGGRAPH)*, 2016; or a U-net architecture and use techniques and approaches found in Olaf Ronneberger et al., "U-Net: Convolutional Networks for Biomedical Image Segmentation," submitted on May 18, 2015, arXiv: 1505.049597, each is which is incorporated herein by reference in its entirety.

As mentioned above, FIG. 7 shows a block diagram of utilizing one or more partial-object segmentation models to generate improved object masks for a digital image in accordance with one or more implementations. As shown, FIG. 7 includes the partial-object segmentation model 312, the input image 302, and the combined object mask set 530. Each of these components is introduced above.

In various implementations, partial-object segmentation models determine multiple object masks corresponding to a particular object. In some implementations, the partial-object segmentation model 312 includes a partial-object segmentation neural network (or simply "partial-object network") trained to segment partial objects for a given object, which allows for more precise selection of portions of the object. Indeed, partial-object networks provide the multi-model object segmentation system 106 with a higher granularity when generating object masks for objects in a digital image. Examples of partial-object segmentation models include, but are not limited to, partial-object networks that generate segments within persons (e.g., a body parser), faces, cars, buildings, trees, clothes, or furniture.

As shown, the partial-object segmentation model 312 includes a flowchart of various acts 702-708 that are performed by the multi-model object segmentation system 106. For example, as illustrated in the partial-object segmentation model 312, the multi-model object segmentation system 106 performs an act 702 of comparing labels from an object mask set to partial-object segmentation models to identify an object mask that matches a partial-object segmentation model. For instance, in many implementations, the multi-model object segmentation system 106 compares the classification labels of the combined object mask set 530 to a table or list of partial-object segmentation models, which indicates whether the object classification of a detected object of an object mask corresponds to a partial-object network.

In some implementations, as with the specialist networks, if the multi-model object segmentation system 106 does not determine any matches between classification labels and partial-object segmentation networks, the multi-model object segmentation system 106 skips utilizing a partial-object segmentation model. In this manner, the multi-model object segmentation system 106 does not waste computing resources attempting to segment partial-objects that are not present in the input image 302. Indeed, the multi-model object segmentation system 106 improves efficiency by utilizing a partial-object segmentation model only when invoking the partial-object network will improve the accuracy of object mask selection in the combined object mask set 530.

For each object mask having a classification that matches the partial-object segmentation model 312, the multi-model object segmentation system 106 utilizes the partial-object segmentation model 312 to generate object masks for the partial-objects. For example, in one or more implementations, upon determining a match, the multi-model object segmentation system 106 provides the matching object mask and the input image 302 to the matching partial-object segmentation model 312. In this manner, the partial-object segmentation model 312 need not perform redundant work of locating the object in the input image 302 but rather, utilizes the matching object mask and the input image 302 to further segment the object, as described next. In alternative implementations, the multi-model object segmentation system 106 provides the input image 302 to the partial-object segmentation model 312, which at least segments the partial objects within corresponding objects.

As shown in the partial-object segmentation model 312, the multi-model object segmentation system 106 performs an act 704 of generating partial-object masks for the object. For example, in one or more implementations, the multi-model object segmentation system 106 utilizes the partial-object segmentation model 312 to segment partial objects within the object in the input image 302. To illustrate, FIG. 7 shows partial-object masks 710 of a person where each part of the person is classified (e.g., labeled) utilizing the partial-object segmentation model 312.

In various implementations, the partial-object segmentation model 312 is trained and executes similar to the object segmentation neural network described above. In these implementations, the partial-object segmentation model 312 is trained in a supervisory manner with a targeted dataset that corresponds to partial objects. For example, the multi-model object segmentation system 106 trains or otherwise obtains an object segmentation neural network that segments different body parts in body objects. In some implementations, the partial-object segmentation model 312 is modified (e.g., the architecture includes additional and/or different neural network layers) to better segment particular partial objects. In one or more implementations, the partial-object segmentation model 312 comprises one of the models described by Wang et al. in *Joint Object and Part Segmentation using Deep Learned Potentials*, In Proc. International Conference on Computer Vision (ICCV), 2015; or J. Dong et al. in *Towards Unified Human Parsing And Pose Estimation*, In CVPR, pages 843-850, 2014; the entire contents of each of which are hereby incorporated by reference.

As shown in the partial-object segmentation model 312, the multi-model object segmentation system 106 performs an act 706 of identifying an object mask hierarchy between the partial-object masks and the object mask. In various implementations, the multi-model object segmentation system 106 adds or modifies a hierarchy attribute to the newly generated partial-object masks and the object mask to indicate a relationship. For example, the multi-model object segmentation system 106 indicates that the object mask is a parent (e.g., encompasses) of the partial-object masks. In some implementations, the multi-model object segmentation system 106 modifies the classification label of partial objects to indicate a hierarchal relationship (e.g., labels of "arm-person" or "head-person" within the object of "person"). Indeed, the multi-model object segmentation system 106 utilizes the knowledge of the partial-object segmentation model 312 to generate child nodes (e.g., partial-object masks) for the object mask.

In example implementations, the multi-model object segmentation system 106 indicates multiple hierarchy levels. For example, the multi-model object segmentation system 106 generates partial-object masks for an object in the input image 302. Further, the multi-model object segmentation system 106 generates partial-object masks for partial-objects. To illustrate, the multi-model object segmentation system 106 utilizes a human body parser model to segment parts of a person, which includes a segmented face. The multi-model object segmentation system 106 then utilizes a portrait segmentation model to segment facial features from the segmented face (which creates a three-level hierarchy structure).

In some implementations, the multi-model object segmentation system 106 determines other object mask hierarchies in the combined object mask set 530 (and/or between the first object mask set and the second object mask set). For example, in one or more implementations, the multi-model object segmentation system 106 compares pixels to identify a smaller object mask that is encompassed by a larger object mask. In some instances, the smaller object mask is at least 80%, 90%, or another hierarchal threshold amount encompassed by the larger object mask. In these implementations, the multi-model object segmentation system 106 assigns a parent-child hierarchy to the object mask pair, where the smaller object mask is assigned as a child of the larger object mask (e.g., the segmented object).

In one or more implementations, the multi-model object segmentation system 106 utilizes classification labels to determine a hierarchal relationship between two segmented objects. For example, if an image includes a first object mask has the classification label of "shirt" and a second object mask has the classification label of "shirt-pocket," then the multi-model object segmentation system 106 may determine that the segmented shirt pocket is a partial object of the shirt. In some implementations, the multi-model object segmentation system 106 utilizes one or more lists of tables that include objects and corresponding partial objects to determine whether a hierarchal relationship exists.

In example implementations, the multi-model object segmentation system 106 determines the object mask hierarchy of object masks separate from the partial-object segmentation model 312. For example, the multi-model object segmentation system 106 utilizes an object mask hierarchy manager within the multi-model object segmentation framework 300 and apart from the partial-object segmentation model 312. For instance, when generating the combined object mask set 530 from the multiple object mask sets, the object mask hierarchy manager determines hierarchal relationships between object masks by grouping any overlapping object masks that meet the hierarchal threshold amount into a hierarchal (e.g., parent-child) pair.

As shown in the specialist object segmentation model 310, the multi-model object segmentation system 106 performs an act 708 of adding the partial-object masks to the object mask set. For example, in one or more implementations, the multi-model object segmentation system 106 updates the combined object mask set 530 by associating the partial-object masks with the segmented object. In this manner, the updated combined object mask set enables the selection of the segmented object using the object mask or the selection of smaller portions of the segmented object using a partial-object mask.

Figure 8:
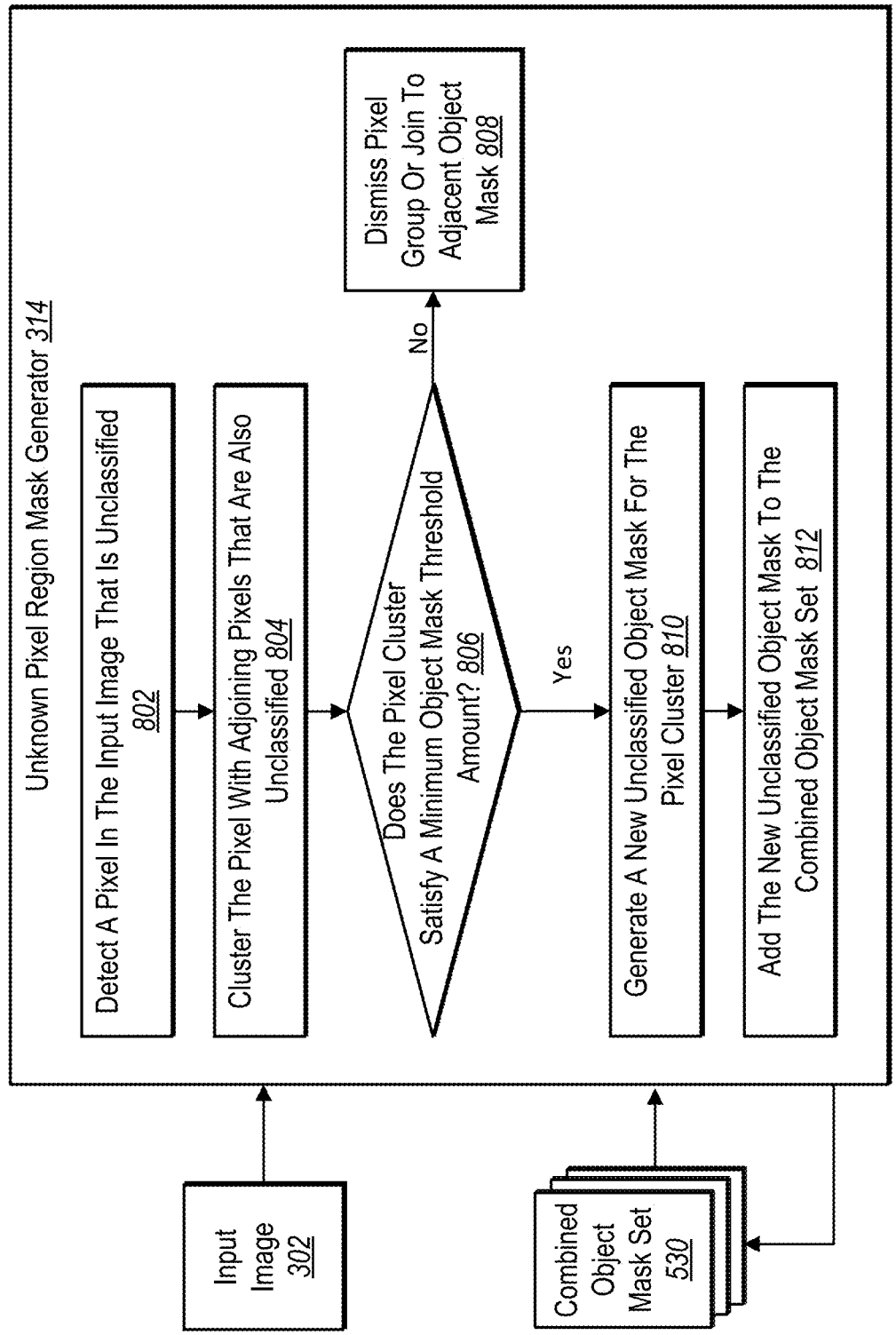
FIG. 8 illustrates a block diagram of generating unclassified object masks for a digital image in accordance with one or more implementations.

As mentioned above, the multi-model object segmentation framework 300 includes the unknown pixel region mask generator 314. FIG. 8 illustrates a block diagram of generating unclassified object masks for a digital image utilizing the unknown pixel region mask generator 314 in accordance with one or more implementations. As shown, FIG. 8 includes the unknown pixel region mask generator 314, the input image 302, and the combined object mask set 530.

In various implementations, the unknown pixel region mask generator 314 generates additional object masks for the input image 302. More specifically, the unknown pixel region mask generator 314 generates one or more object masks for pixels of the input image 302 not included in the combined object mask set. Often, the multi-model object segmentation system 106 performs the actions associated with the unknown pixel region mask generator 314 near the end of the multi-model object segmentation framework 300, when other object masks have been modified or refined. For instance, because the multi-model object segmentation system 106 is not running additional object segmentation models, pixels not assigned to an object mask will not otherwise be assigned. Further, through refining or modifying an object mask utilizing a specialist object segmentation model or partial-object segmentation model, various pixels previously assigned to an object mask are now unassigned or left unlabeled.

As shown, the unknown pixel region mask generator 314 includes a flowchart of various acts 802-812 that the multi-model object segmentation system 106 performs. For example, as illustrated in the unknown pixel region mask generator 314, the multi-model object segmentation system 106 performs an act 802 of detecting a pixel in the input image that is unclassified. In one or more implementations, the multi-model object segmentation system 106 overlays the object mask set in the combined object mask set 530 to identify one or more pixels that do not have an object classification label (e.g., are not assigned to an object mask). In some instances, the multi-model object segmentation system 106 utilizes a table or mapping to look up which pixels are not assigned to an object mask (e.g., a list of unclassified pixels).

As shown, the unknown pixel region mask generator 314 includes the multi-model object segmentation system 106 performing an act 804 of clustering the pixel with adjoining pixels that are also unclassified. For example, in one or more implementations, the multi-model object segmentation system 106 identifies pixels connected (e.g., next to, touching, or within a threshold distance) to the unclassified pixel that is also unclassified. The multi-model object segmentation system 106 continues to identify other adjoining pixels that are unclassified. In various implementations, the multi-model object segmentation system clusters or groups the unclassified pixels together.

As shown, the unknown pixel region mask generator 314 includes the multi-model object segmentation system 106 performing an act 806 of determining if the pixel cluster satisfies a minimum object mask threshold amount. For example, in one or more implementations, the multi-model object segmentation system 106 compares the size of the pixel cluster to a minimum object mask threshold amount to determine whether the pixel cluster is sufficiently large. In one or more implementations, the minimum object mask threshold amount is a number of pixels (e.g., 10, 50, 100 pixels). In some implementations, the minimum object mask threshold amount is a percentage of total pixels in the input image, such as 0.01% 0.5%, 1.0%, or 2% of the input image size. In example implementations, the minimum object mask threshold amount varies based on the input image size.

If the pixel cluster does not satisfy the minimum object mask threshold amount, in one or more implementations, the multi-model object segmentation system 106 dismisses the pixel group, as shown in the act 808. For example, the multi-model object segmentation system 106 ignores the pixel cluster as trivial or as insignificant.

In some implementations, the multi-model object segmentation system 106 joins the pixel cluster to an adjacent object mask, as also shown in the act 808. For instance, the multi-model object segmentation system 106 adds pixels in a pixel cluster to an adjacent object mask based on correlating pixel colors. In one or more implementations, the multi-model object segmentation system 106 assigns different pixels to different object masks based on proximity and/or color. In various implementations, the multi-model object segmentation system 106 assigns a pixel to an adjacent object mask by classifying the pixel with the same classification as the object mask. In example implementations, the multi-model object segmentation system 106 utilizes a connected component algorithm to detect the adjacent classified object mask to which an unclassified pixel may be connected.

If the multi-model object segmentation system 106 determines that the pixel cluster satisfies the minimum object mask threshold amount (e.g., the act 806), the multi-model object segmentation system 106 performs the act 810 of generating a new unclassified object mask of the pixel cluster. For example, in one or more implementations, the multi-model object segmentation system 106 segments the pixel cluster into a new unclassified object mask. In additional implementations, the multi-model object segmentation system 106 classifies the object mask with a label of "unknown," "unclassified," "background," "null," or "no label" In some implementations, the multi-model object segmentation system 106 assigns a classification label based on the color of the pixel cluster, a numbering scheme, and/or the size of the pixel cluster. In some implementations, the multi-model object segmentation system 106 provides the pixel cluster to an object detection neural network to determine the most likely object class.

Lastly, as shown, the unknown pixel region mask generator 314 includes the multi-model object segmentation system 106 performing an act 812 of adding the new unclassified object mask to the combined object mask set 530. For example, in various implementations, the multi-model object segmentation system 106 includes the new unclassified object mask among the refined object masks. Accordingly, if a user selects the region in the input image 302 corresponding to the new unclassified object mask, the multi-model object segmentation system 106 utilizes the new unclassified object mask to automatically select the region.

In various implementations, the multi-model object segmentation system 106 repeats the acts 802-812 for all unclassified pixels in the input image 302. As a result, the combined object mask set more fully covers all regions of the input image 302 where a user may select. Indeed, because all regions in the input image 302 correspond to at least one object mask, the multi-model object segmentation system 106 is able to automatically select any region where a user may submit a submission request including regions without classified objects.

FIG. 8 and the identified corresponding figures describe various embodiments of the unknown pixel region mask generator 314. Accordingly, the actions and algorithms described in connection with FIG. 8 and previously identified figures (e.g., FIG. 3) provide example structure and architecture for performing a step for generating one or more additional object masks for unknown pixel regions in the digital image. Indeed, the description, block diagrams, and charts described in connection with FIGS. 3 and 8 provide structure for one or more of the algorithms corresponding to the multi-model object segmentation system 106 and the unknown pixel region mask generator 314.

Figure 9:
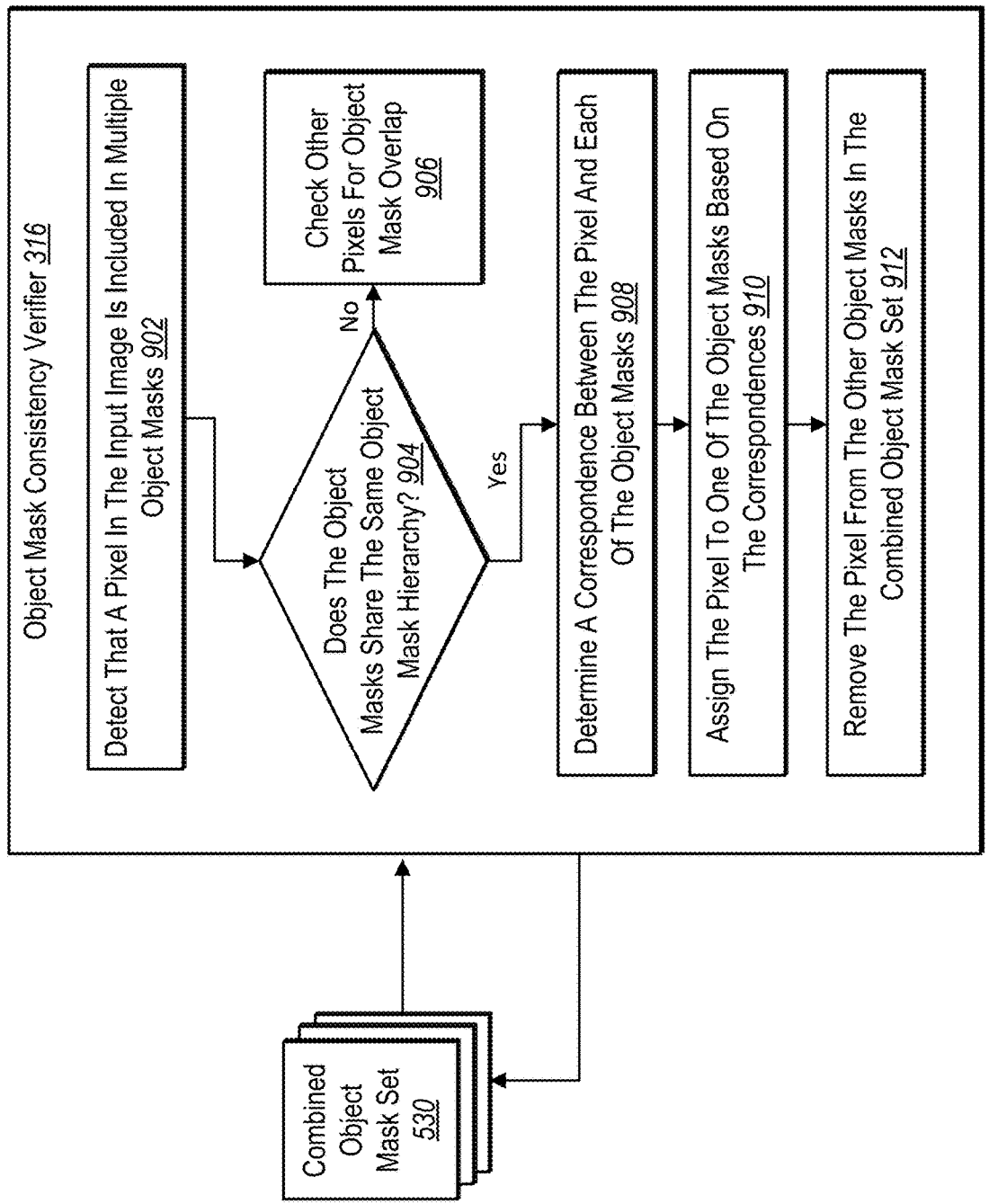
FIG. 9 illustrates a block diagram of verifying the consistency of an object mask set for a digital image in accordance with one or more implementations.

As mentioned above, the multi-model object segmentation framework 300 includes the object mask consistency verifier 316. FIG. 9 illustrates a block diagram of utilizing the object mask consistency verifier 316 to verify the consistency of an object mask set for a digital image in accordance with one or more implementations. As shown, FIG. 9 includes the object mask consistency verifier 316 and the combined object mask set 530.

In various implementations, the object mask consistency verifier 316 performs various checks and refinements to an object mask set (e.g., the combined object mask set 530). As an example, the multi-model object segmentation system 106 utilizes the object mask consistency verifier 316 to verify that the number of pixels in the combined object mask set 530 for a hierarchy level does not exceed the number of pixels in the input image. Indeed, because the multi-model object segmentation framework 300 includes different models, operations, and functions (including many that may operate in parallel), the object mask consistency verifier 316 ensures accuracy and consistency across the combined object mask set. In this manner, the multi-model object segmentation system 106 protects against possible errors that could occur when automatically selecting a target object in response to a selection request.

As illustrated in FIG. 9, the object mask consistency verifier 316 includes a flowchart of various acts 902-912 that the multi-model object segmentation system 106 performs. For example, as illustrated in the object mask consistency verifier 316, the multi-model object segmentation system 106 performs an act 902 of detecting that a pixel in the input image is included in multiple object masks within the combined object mask set 530. In various implementations, a model may include a pixel to more than one object mask. To illustrate, a pixel in a digital image of a roadway with cars may be 60% car and 40% road (e.g., the pixel has matting that reflects multiple objects). However, the pixel is assigned as "road" in a first object mask and as "car" in a second object mask, which causes the pixel to be double assigned (e.g., double counted). Further, the use of multiple object segmentation models in the multi-model object segmentation framework 300 compounds the problem of assigning the same pixel to different objects and/or object classifications.

As shown in the object mask consistency verifier 316, the multi-model object segmentation system 106 performs an act 904 of determining whether the object masks share the same mask hierarchy. In implementations where the partial-object segmentation model generates partial-object masks within an object mask, pixels in the sub-objects will overlap with the pixels in the parent object. Accordingly, the multi-model object segmentation system 106 determines if the pixel assigned to multiple object masks are part of a parent-child hierarchal relationship. If so, the multi-model object segmentation system 106 performs an act 906 of checking other pixels for object mask overlap, as shown in the object mask consistency verifier 316.

If, however, the object masks belong to the same object hierarchy, the multi-model object segmentation system 106 performs an act 908 of determining a correspondence between the pixel and each of the object masks, as shown in the object mask consistency verifier 316. For example, in one or more implementations, the multi-model object segmentation system 106 compares color, distance, saturation, sharpness, and/or opacity between the pixel and pixels in each of the object masks to determine a correspondence score for each object mask.

In some implementations, the multi-model object segmentation system 106 utilizes a multi-label graph cut function to determine correspondence scores for the object masks. For example, in one or more implementations, a multi-label graph cut function determines a penalty of assigning the pixel to each of the object masks. Based on the penalties (e.g., costs), the multi-model object segmentation system 106 generates a correspondence score for the pixel to each object mask.

In various implementations, the multi-model object segmentation system 106 utilizes a label prediction neural network to assign to determine correspondence scores for the object masks. For example, the label prediction neural network receives each object mask and their corresponding label along with the pixel and determines (e.g., utilizing a SoftMax classifier) correspondences score for the pixel to each object mask. In some implementations, the multi-model object segmentation system 106 trains the label prediction neural network. In alternative implementations, the multi-model object segmentation system 106 obtains a trained label prediction neural network.

As shown in the object mask consistency verifier 316, the multi-model object segmentation system 106 performs an act 910 of assigning the pixel to one of the object masks based on the correspondences. For instance, in one or more implementations, the multi-model object segmentation system 106 assigns the pixel to the object mask to which the pixel shares the highest correspondence score. In particular, the multi-model object segmentation system 106 classifies the pixels with the same classification label as the higher corresponding object mask. Indeed, in various implementations, the multi-model object segmentation system 106 adds the pixel to the higher corresponding object mask.

As shown in the object mask consistency verifier 316, the multi-model object segmentation system 106 performs an act 912 of removing the pixel from the other object masks in the combined object mask set 530. For example, in various implementations, the multi-model object segmentation system 106 removes the pixel for the other overlapping object masks by removing the classification label of the pixel or deleting the pixel for the object mask (e.g., changing the value of the pixel from 1 to 0 or vice versa). In this manner, the multi-model object segmentation system 106 ensures that the pixel is assigned to only one object mask within the same hierarchy level of the combined object mask set 530.

Turning now to FIGS. 10A-10D, various graphical examples of the multi-model object segmentation system 106 automatically selecting a target object or a partial target object in an input image are described. For instance, FIGS. 10A-10D illustrate a graphical user interface for automatically selecting an object or partial object in accordance with one or more implementations.

As shown, FIGS. 10A-10D illustrate a client device 1000 having a graphical user interface 1002 that includes an image 1004 (i.e., a digital image or input image). In various implementations, the client device 1000 represents the client device 102 introduced above with respect to FIG. 1. As illustrated, the client device 1000 includes an image editing application that implements the image editing system 104, which utilizes the multi-model object segmentation system 106. Also, in some implementations, the multi-model object segmentation system 106, or optionally the image editing application, generates the graphical user interface 1002 in FIGS. 10A-10D.

In various implementations, the image editing application facilitates user interaction with the image 1004. For example, the image editing application and/or the multi-model object segmentation system 106 provides a selection tool (e.g., an automatic object selection tool or a magic object selection tool) that enables the user to provide an object selection request. In some implementations, the default mode of the image editing application is a pointer that automatically selects an object when the pointer comes into contact with it (e.g., this constitutes an object selection request in some implementations). Indeed, in response to detecting an object selection request with respect to a target object, the multi-model object segmentation system 106 automatically selects the target object.

Figure 10A:
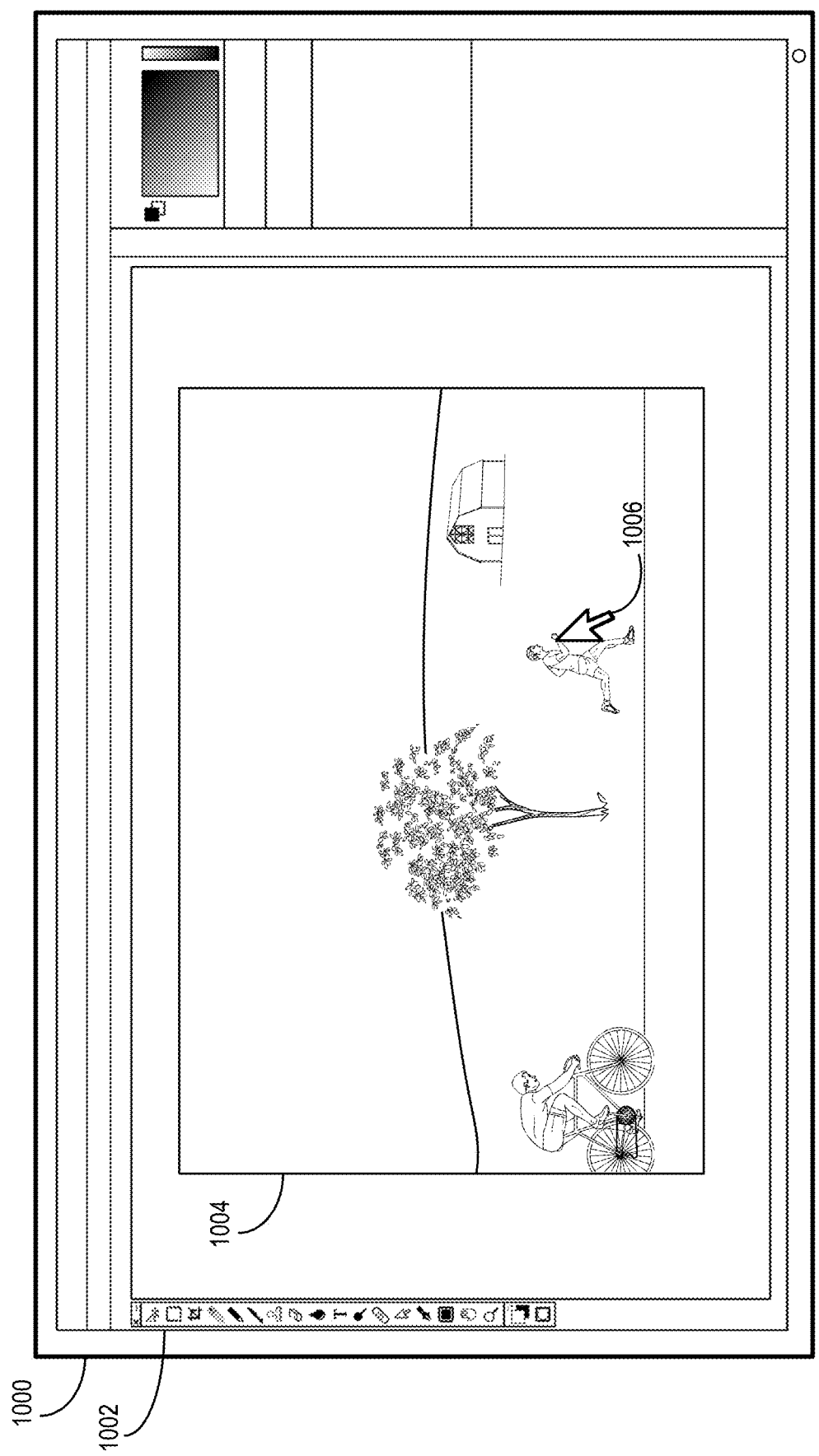
FIGS. 10A-10D illustrate a graphical user interface of automatically selecting an object or partial object in accordance with one or more implementations.

To further illustrate, FIG. 10A shows a pointer 1006 (e.g., a mouse) that is controlled by a user on the client device 1000. Using the pointer 1006, the user selects a target object. For instance, the user hovers, clicks, or holds down the pointer 1006 on a target object. While FIGS. 10A-10D include a pointer 1006, the image editing application and/or multi-model object segmentation system 106 is able to detect other forms of user input, such as touch selection, touch pressure, or touch gestures on the client device 1000 or from input of another device paired to the client device 1000.

In response to detecting the selection request based on the user interaction, in one or more implementations, the multi-model object segmentation system 106 automatically selects the target object. For example, the multi-model object segmentation system 106 provides the image 1004 to the multi-model object segmentation framework 300, as described above, to generate a combined object mask set for the image 1004. Then, in response to detecting the selection request of a target object, in various implementations, the multi-model object segmentation system 106 utilizes the location of the pointer 1006 to identify the object mask in the combined object mask set that corresponds to the target object. Further, the multi-model object segmentation system 106 utilizes the identified object mask to select the target object.

Figure 10B:
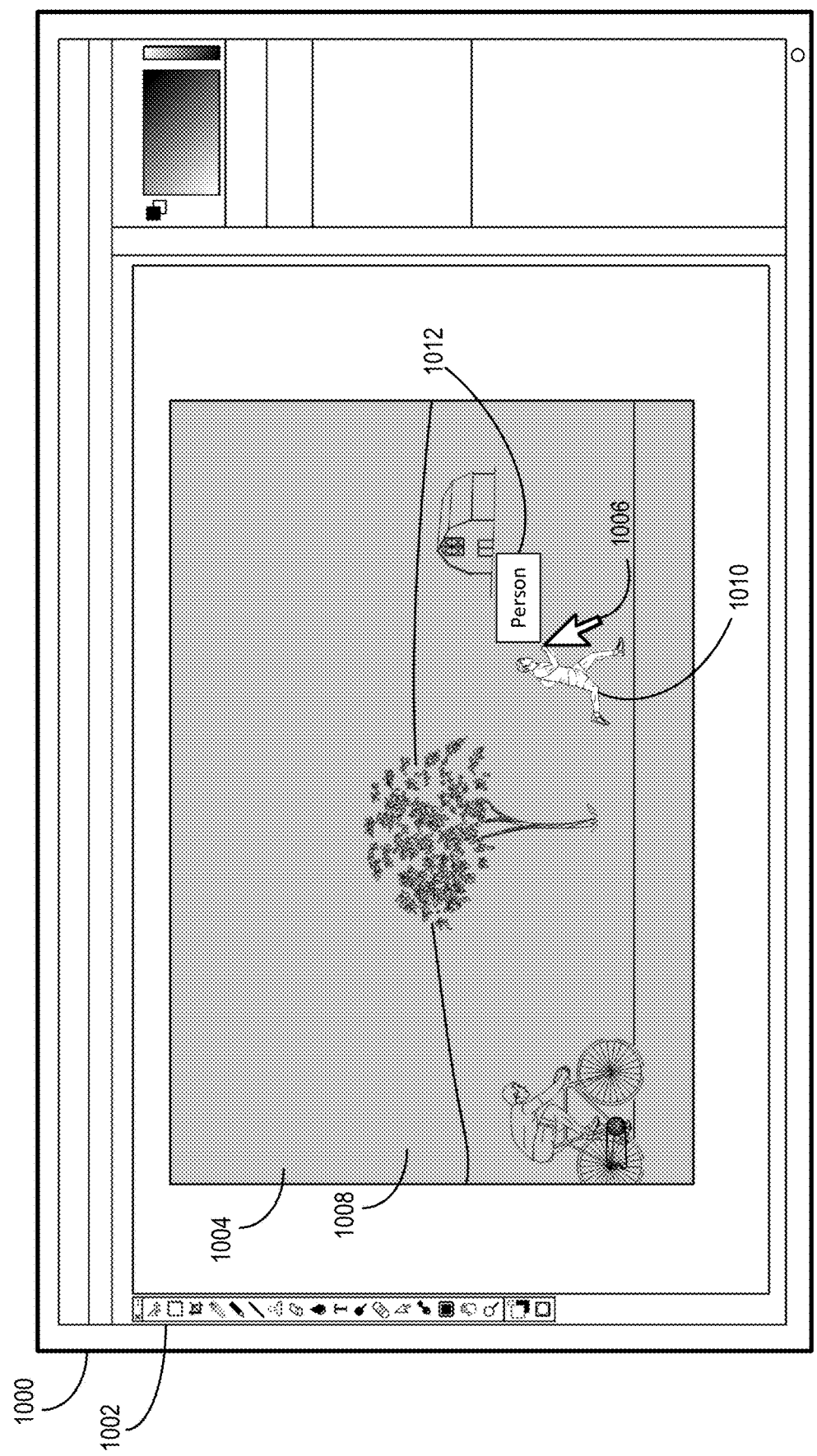

To illustrate, FIG. 10B shows the multi-model object segmentation system 106 automatically selecting the person 1010 (e.g., the runner) in response to detecting the selection request while unselecting the remaining image portion 1008. In addition to automatically selecting the target object, in various implementations, the multi-model object segmentation system 106 provides the classification label 1012 for display within the graphical user interface 1002, as shown.

In one or more implementations, the multi-model object segmentation system 106 enables the selection of all objects in the image 1004, including background and unclassified objects. For example, by utilizing multiple object segmentation models on the image 1004, the multi-model object segmentation system 106 segments all semantic regions in the image. Further, by utilizing the unknown pixel region mask generator, the multi-model object segmentation system 106 generates object masks for any remaining pixel regions not otherwise segmented.

In many implementations, the multi-model object segmentation system 106 determines the combined object mask set for the image 1004 before segmenting a selection request. For instance, the multi-model object segmentation system 106 processes the image 1004 upon it being loaded to the image editing application to generate the combined object mask set. In these implementations, the multi-model object segmentation system 106 is able to quickly provide the object mask corresponding to the target request. For example, as the user moves, hovers over, or clicks different target objects, the multi-model object segmentation system 106 is able to quickly update the image 1004 to select, emphasize, or highlight corresponding objects. Indeed, the multi-model object segmentation system 106 is able to quickly and efficiently provide highly-accurate object masks for every object in the image 1004.

In some implementations, rather than generating the combined object mask set before receiving the selection request, the multi-model object segmentation system 106 pauses at one or more stages along with the multi-model object segmentation framework 300. For example, the multi-model object segmentation system 106 generates multiple sets of masks for the image 1004 but does not perform the merging action until the selection request is detected. For instance, utilizing the location of the selection request, the multi-model object segmentation system 106 determines whether pixel overlap occurs at that location, and/or if the object mask(s) at that location correspond to additional refinement object segmentation models, as described above. In these implementations, the multi-model object segmentation system 106 may perform real-time and on-demand object segmentation of the image 1004.

As mentioned above, in addition to automatically selecting objects in an image, the multi-model object segmentation system 106 is capable of automatically selecting partial objects. To elaborate, in one or more implementations, upon receiving an additional selection request, the multi-model object segmentation system 106 automatically selects a target partial object. For example, the multi-model object segmentation system 106 detects a second click of a previously selected target object or detects hovering the pointer 1006 over the target object beyond a time threshold (e.g., 2 seconds). In some implementations, the multi-model object segmentation system 106 detects different selection methods indicating a selection request of a partial target object, such as detecting a modifier keyboard key pressed in combination with a mouse click. For example, on a touchscreen client device, the multi-model object segmentation system 106 detects different pressure amounts or selection duration.

In response to detecting the selection request of a partial target object (e.g., an additional selection request), the multi-model object segmentation system 106 automatically selects the target partial object. For example, the multi-model object segmentation system 106 provides the image 1004 to a partial-object segmentation model within the multi-model object segmentation framework 300 to generate partial-object masks for the image 1004, which are included in the combined object mask set, as described above. The multi-model object segmentation system 106 then utilizes the pointer 1006 to identify and automatically select the corresponding partial-object mask of the target partial object within the image 1004.

Figure 10C:
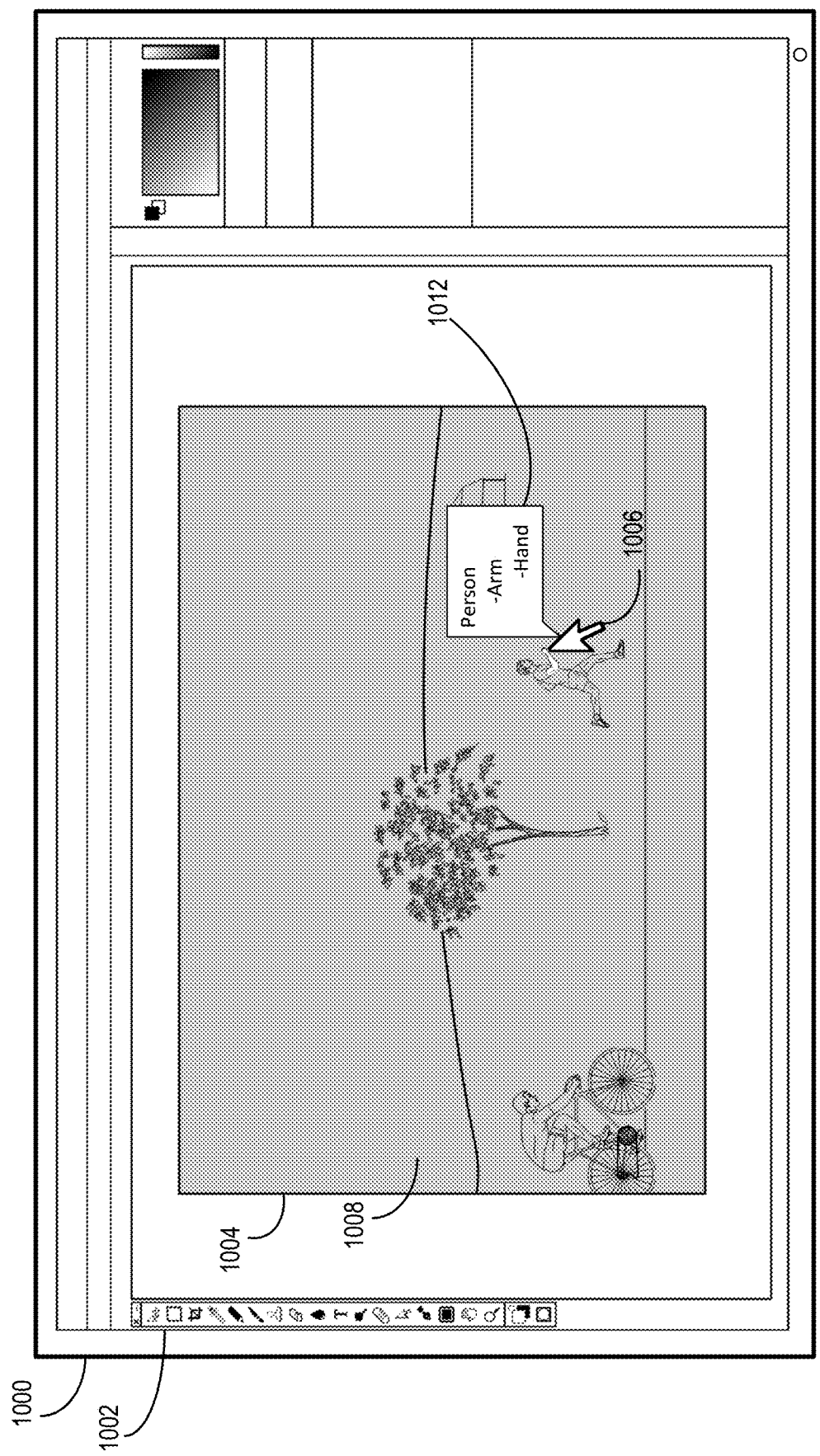

In some implementations, the multi-model object segmentation system 106 provides multiple labels for displays if the pointer 1006 corresponds to multiple object masks, and in particular, object masks at the same location having different hierarchy levels. To illustrate, FIG. 10C shows the selection request described above. However, because the pointer 1006 corresponds to multiple object mask set at the same location, the multi-model object segmentation system 106 displays multiple classification labels 1012.

As shown, the multiple classification labels 1012 indicate that the selection request corresponds to the person, the arm of the person, or the hand of the person (which is part of the arm). In response to detecting a selection of one of the labels, the multi-model object segmentation system 106 selects the requested target object. To illustrate, in response to the selection request specifying to select the arm of the person (e.g., selecting the "arm" label from the multiple classification labels 1012 or providing multiple pointer clicks to cycle through the labels), the multi-model object segmentation system 106 automatically selects the arm while isolating out the other pixels in the image 1004, as shown.

In various implementations, the multi-model object segmentation system 106 shows multiple object masks corresponding to the location of the pointer 1006 and/or a selection request together within the image 1004. For example, the multi-model object segmentation system 106 shows a first color selecting the person. The multi-model object segmentation system 106 then adds a second color over the arm, where the first and color mix (or not). Further, the multi-model object segmentation system 106 then adds a third color over the hand. In some implementations, the multi-model object segmentation system 106 utilizes line dashes and/or line brightness to indicate a partial object that is selectable within an object. In one implementation, the multi-model object segmentation system 106 changes the icon of the pointer 1006 to indicate when a partial object is available for automatic selection.

Figure 10D:
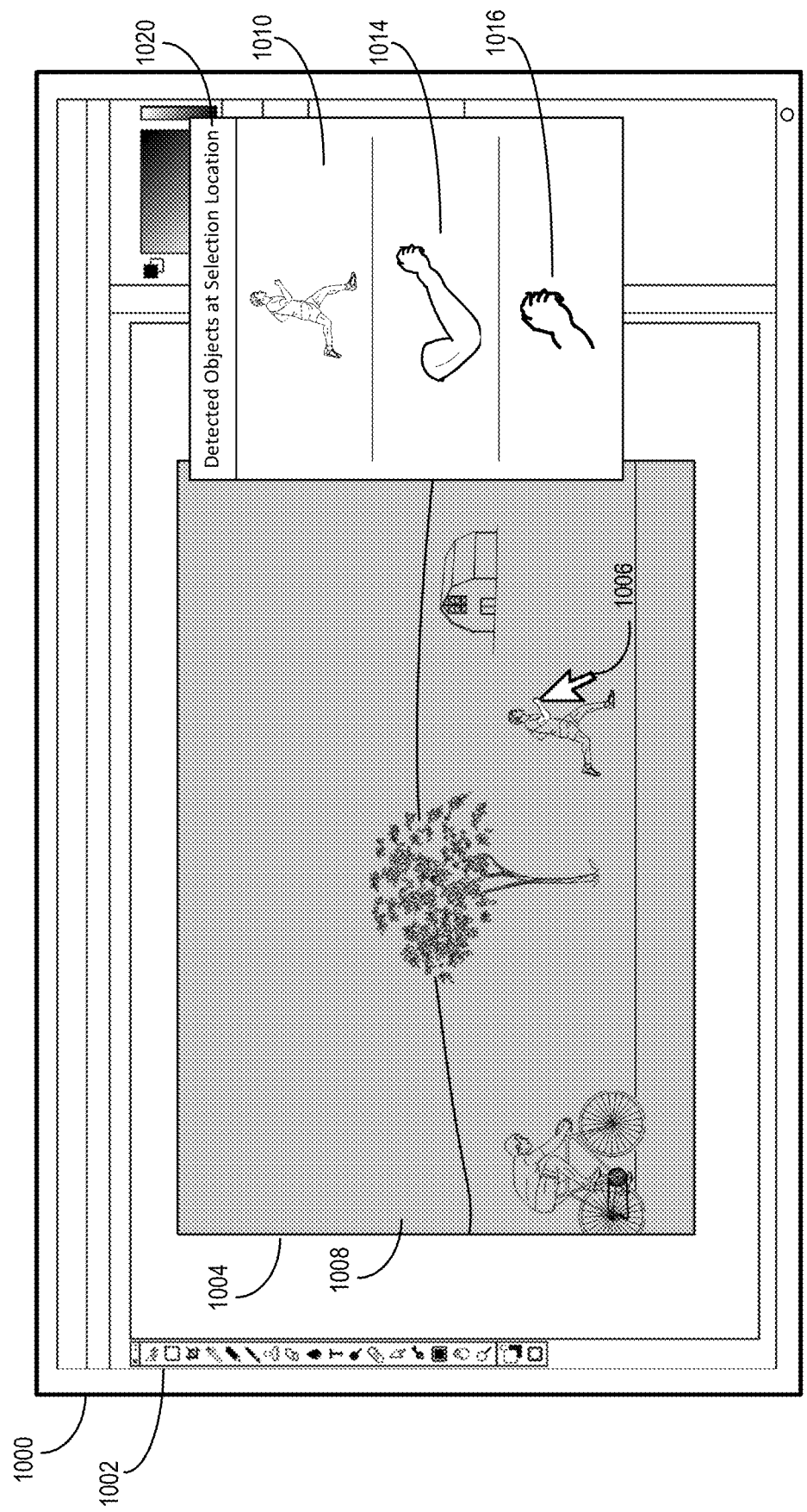

In some implementations, the multi-model object segmentation system 106 provides a selection interface of each corresponding object or partial object instance corresponding to the location of the pointer 1006 and/or a selection request. To illustrate, FIG. 10D shows a segmented objects selection interface 1020 that includes each object or partial object associated with the location of the pointer 1006. For example, in response to detecting the selection request, the multi-model object segmentation system 106 determines that multiple objects and/or partial objects are located at or near the location of the pointer 1006. Accordingly, the multi-model object segmentation system 106 generates and displays each of the objects available to be automatically selected. As shown, the segmented objects selection interface 1020 includes the person 1010, the arm 1014, and the hand 1016. Based on the user interacting with the segmented objects selection interface 1020, the multi-model object segmentation system 106 automatically selects the indicated object or partial object within the image 1004.

Figure 11:
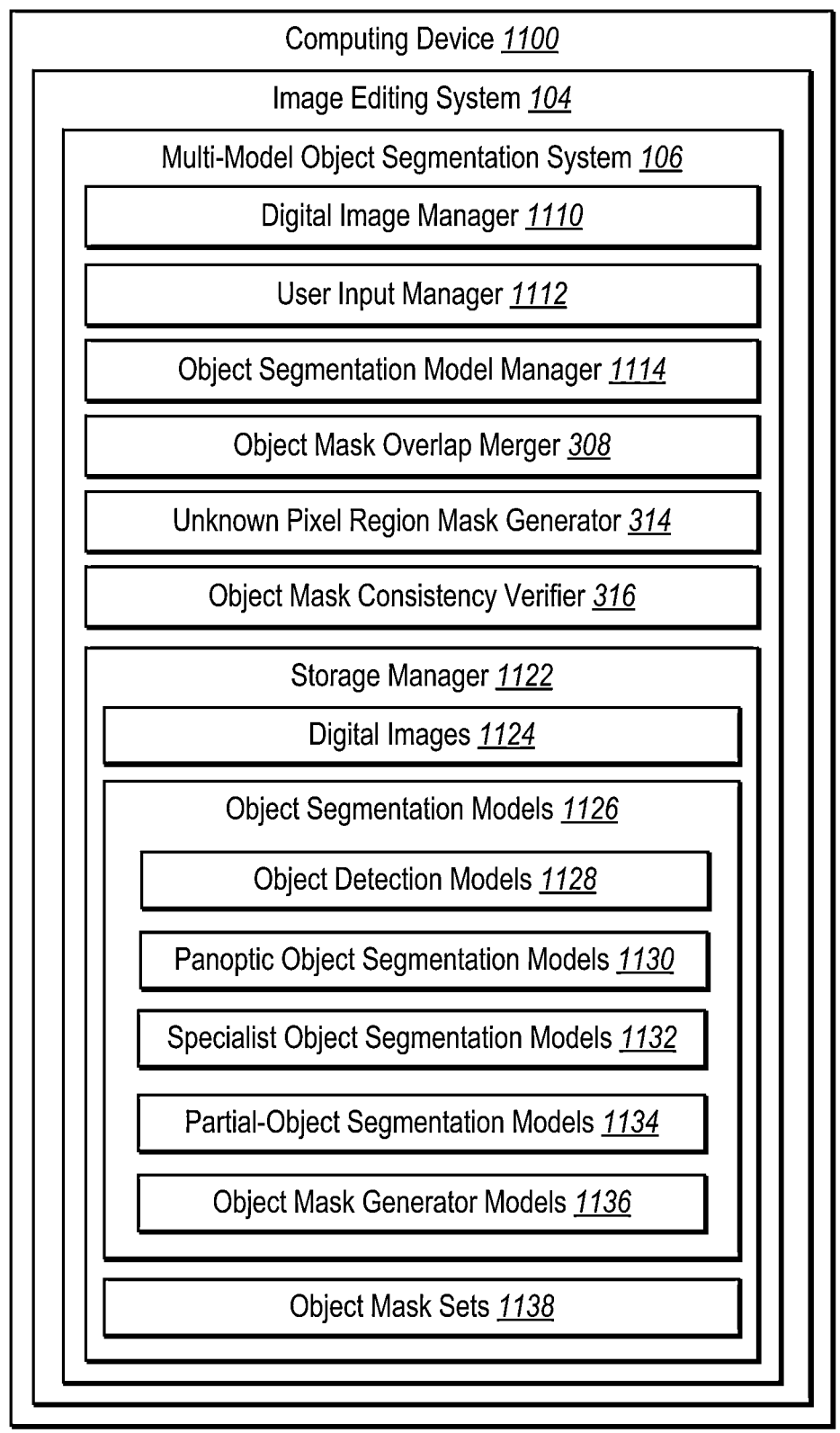
FIG. 11 illustrates a schematic diagram of the multi-model object segmentation system in accordance with one or more implementations.

Referring now to FIG. 11, additional detail is provided regarding the capabilities and components of the multi-model object segmentation system 106 in accordance with one or more implementations. In particular, FIG. 11 shows a schematic diagram of an example architecture of the multi-model object segmentation system 106 implemented within the image editing system 104 and hosted on a computing device 1100.

As shown, the multi-model object segmentation system 106 is located on a computing device 1100 within an image editing system 104. In general, the computing device 1100 may represent various types of client devices. For example, in some implementations, the client is a mobile device, such as a laptop, a tablet, a mobile telephone, a smartphone, etc. In other implementations, the computing device 1100 is a non-mobile device, such as a desktop or server, or another type of client device. Additional details with regard to the computing device 1100 are discussed below as well as with respect to FIG. 11.

As illustrated in FIG. 11, the multi-model object segmentation system 106 includes various components for performing the processes and features described herein. For example, the multi-model object segmentation system 106 includes a digital image manager 1110, a user input manager 1112, an object segmentation model manager 1114, an object mask overlap manager 308, an unknown pixel region mask generator 314, an object mask consistency verifier 316, and a storage manager 1122. As shown, the storage manager 1122 includes digital images 1124, object segmentation models 1126, and object mask sets 1138. Each of the components mentioned above is described below in turn.

As mentioned above, the multi-model object segmentation system 106 includes the digital image manager 1110. In general, the digital image manager 1110 facilitates identifying, accessing, receiving, obtaining, generating, importing, exporting, copying, modifying, removing, and organizing images. In one or more implementations, the digital image manager 1110 operates in connection with an image editing system 104 (e.g., an image editing application) to access and edit images, as described previously. In some implementations, the digital image manager 1110 communicates with the storage manager 1122 to store and retrieve the digital images 1124, for example, within a digital image database managed by the storage manager 1122.

As shown, the multi-model object segmentation system 106 includes the user input manager 1112. In various implementations, the user input manager 1112 is configured to detect, receive, and/or facilitate user input on the computing device 1100. In some instances, the user input manager 1112 detects one or more user interactions (e.g., a single interaction, or a combination of interactions) with respect to a digital image in a graphical user interface. For example, the user input manager 1112 detects a user interaction from a keyboard, mouse, touchpad, touchscreen, and/or any other input device in connection with the computing device 1100. For instance, the user input manager 1112 detects user input with respect to a selection request of a target object or partial object within an input image, as described above.

As shown, the multi-model object segmentation system 106 includes the object segmentation model manager 1114. In various embodiments, the object segmentation model manager 1114 maintains, creates, generates, trains, updates, accesses, and/or utilizes the object segmentation models disclosed herein. As described above, the object segmentation model manager 1114 segments one or more objects within an image (e.g., an input image) by generating a refined object mask set of objects within the image. For example, the object segmentation model manager 1114 generates a combined or modified object mask set, as described above.

In several embodiments, the object segmentation model manager 1114 communicates with the storage manager 1122 to store, access, and utilize the object segmentation models 1126. In various embodiments, the object segmentation models 1126 include one or more object detection models 1128, panoptic object segmentation models 1130, specialist object segmentation models 1132 (e.g., a sky segmentation neural network, a face segmentation neural network, a body segmentation neural network, or a skin segmentation neural network), partial-object segmentation models 1134, and object mask generator models 1136, each of which is described above in detail.

As shown, the multi-model object segmentation system 106 includes the object mask overlap manager 308. In one or more implementations, the object mask overlap manager 308 generates an object mask set 1138 for an input image, such as a combined object mask set and/or a modified object mask set. As described above, in various implementations, the object mask overlap manager 308 combines merged object masks as well as non-overlapping object masks from multiple object segmentation models into a combined set of object masks for an input image.

As shown, the multi-model object segmentation system 106 includes the unknown pixel region mask generator 314. In various implementations, the unknown pixel region mask generator 314 generates object masks for clusters of pixels in an input image that are otherwise unsegmented. In one or more implementations, the unknown pixel region mask generator 314 determines if a cluster of adjoining unclassified pixels satisfies a minimal object mask threshold amount, and, if so, generates an unclassified object mask for the pixel cluster, as described above.

As shown, the multi-model object segmentation system 106 includes the object mask consistency verifier 316. In various implementations, the object mask consistency verifier 316 authenticates the accuracy and consistency of a combined object mask set. For example, in some implementations, the object mask consistency verifier 316 identifies and corrects pixels in an input image that are assigned to multiple object masks, as described above.

Each of the components of the multi-model object segmentation system 106 optionally includes software, hardware, or both. For example, the components optionally include one or more instructions stored on a computer-readable storage medium and executable by processors of one or more computing devices, such as a client device (e.g., a mobile client device) or server device. When executed by one or more processors, the computer-executable instructions of the multi-model object segmentation system 106 causes a computing device to perform the feature learning methods described herein. Alternatively, the components optionally include hardware, such as a special-purpose processing device to perform a certain function or group of functions. In addition, the components of the multi-model object segmentation system 106 optionally include a combination of computer-executable instructions and hardware.

Furthermore, the components of the multi-model object segmentation system 106 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications software packages. The foregoing are either registered trademarks or trademarks of Adobe Inc. in the United States and/or other countries.

FIGS. 1-11, the corresponding text, and the examples provide several different methods, systems, devices, and non-transitory computer-readable media of the multi-model object segmentation system 106. In addition to the foregoing, one or more implementations are described in terms of flowcharts comprising acts for accomplishing a particular result, such as the flowcharts of acts shown in FIG. 12. Additionally, the acts described herein may be repeated or performed in parallel with one another or parallel with different instances of the same or similar acts.

As mentioned, FIG. 12 illustrates a flowchart of a series of acts in accordance with one or more implementations. While FIG. 12 illustrates acts according to one implementation, alternative implementations may omit, add to, reorder, and/or modify any of the acts shown. The acts of FIG. 12 are optionally performed as part of a method. Alternatively, a non-transitory computer-readable medium comprises instructions that, when executed by one or more processors, cause a computing device to perform the acts of FIG. 12. In some implementations, a system is configured to perform the acts of FIG. 12.

To illustrate, FIG. 12 shows a flowchart of a series of acts 1200 of utilizing multiple object segmentation models to automatically select objects in digital images in accordance with one or more implementations. In various implementations, the series of acts 1200 is implemented on one or more computing devices, such as the client device 102, the server device 108, the client device 1000, or the computing device 1100. In addition, in some implementations, the series of acts 1200 is implemented in a digital environment for creating or editing digital content (e.g., digital images). For example, the series of acts 1200 is implemented on one or more computing devices (e.g., server devices) having memory (or memory devices) that includes objects within a plurality of digital images having multiple objects.

The series of acts 1200 includes an act 1210 of generating a first and second set of object masks for a digital image. For instance, the act 1210 includes generating a first set of object masks for a digital image including a plurality of objects utilizing a first object segmentation machine-learning model and generating a second set of object masks for the digital image utilizing a second object segmentation machine-learning model. In one or more implementations, the act 1210 includes generating the first set of object masks for the digital image utilizing a first object segmentation neural network that segments known object classes within the digital image and generating the second set of object masks for the digital image utilizing a second object segmentation neural network that segments semantic objects within the digital image.

In example implementations, the act 1210 includes generating the first set of object masks and the second set of object masks for the digital image utilizing a first object segmentation neural network to segment a first number of objects in the digital image and a second object segmentation neural network to segment a second number of objects in the digital image, where the second number differs from the first number, and where the first and second object segmentation neural networks segment some of the same objects in the digital image.

As shown, the series of acts 1200 also includes an act 1220 of detecting an overlap between the first set of object masks and the second set of object masks. For instance, the act 1220 involves detecting an overlap between a first object mask from the first set of object masks and a second object mask from the second set of object masks. In one or more implementations, the act 1220 includes detecting the overlap by determining that a first set of pixels included in the first object mask overlaps a second set of pixels included in the second object mask by at least a pixel overlap threshold amount. In some implementations, the act 1220 includes matching object classification labels associated with the first object mask and the second object mask.

As shown in FIG. 12, the series of acts 1200 further includes an act 1230 of merging the overlapping object masks to generate a combined object mask. For instance, the act 1230 includes merging the overlapping first and second object masks to generate a combined object mask for the digital image. In one or more implementations, the act 1230 includes modifying the first set of object masks based on the second set of object masks to generate a modified set of object masks.

In various implementations, the act 1230 includes combining the overlapping first and second object masks by identifying a set of non-overlapping pixels in the first object mask from the first set of object masks that is non-overlapping with the second object mask from the second set of object masks and generating the combined object mask by adding the set of non-overlapping pixels to the pixels included in the second object mask.

As shown, the series of acts 1200 also includes an act 1240 of generating a third set of object masks with the combined object mask and non-overlapping object masks.

For instance, the act 1240 includes generating a third set of object masks for the digital image that includes the combined object mask and non-overlapping object masks from the first set of object masks and the second set of object masks. In one or more implementations, the act 1240 includes modifying the first set of object masks by detecting a plurality of adjoining pixels in the digital image that does not correspond to the first set of object masks and the second set of object masks, generating a new object mask including the plurality of adjoining pixels, and adding the new object mask to the modified set of object masks (e.g., the combined object mask set). In example implementations, the act 1240 includes modifying the first set of object masks based on the second set of object masks by refining one or more object masks in the first set of object masks with one or more overlapping object masks from the second set of object masks.

In some implementations, the act 1240 also includes generating the new object mask including the plurality of adjoining pixels based on determining that the plurality of adjoining pixels satisfies a minimum object mask threshold amount with respect to a total number of pixels in the digital image. In various implementations, the act 1240 includes generating an unknown classification label for the new object mask including the plurality of adjoining pixels.

As shown, the series of acts 1200 includes an act 1250 of providing an object mask of the target object based on detecting a selection request of the target object. For instance, the act 1250 includes providing an object mask of the target object from the third set of object masks for the digital image based on detecting a selection request of a target object in the digital image. In one or more implementations, the act 1250 includes detecting a selection request of a target object in the digital image. Further, in some implementations, the act 1250 includes utilizing an object mask from the modified set of object masks corresponding to a target object to select the target object.

The series of acts 1200 optionally includes additional acts. For example, in one or more implementations, the series of acts 1200 includes an act of refining the combined object mask by utilizing an object mask machine-learning model to improve segmentation of a corresponding object in the digital image. In some implementations, the series of acts 1200 includes an act of classifying each segmented object in the digital image corresponding to the first set of object masks. In various implementations, the series of acts 1200 also includes acts of determining that an object mask of a third set of object masks corresponds to a specialist object segmentation neural network based on a classification label assigned to the object mask; providing the object mask and the digital image to the specialist object segmentation neural network to generate an updated object mask based on the determination; and replacing the object mask in the third set of object masks with the updated object mask.

In various implementations, the series of acts 1200 includes acts of determining that an object mask of the third set of object masks corresponds to a partial-object segmentation neural network based on a classification label assigned to the object mask of the segmented/target object; providing the object mask and the digital image to the partial-object segmentation neural network to generate a plurality of partial-object masks within the object mask based on the determination; and updating the third set of object masks to add the plurality of partial-object masks as sub-masks within the object mask. In example implementations, the series of acts 1200 also includes acts of identifying an object mask hierarchy between the plurality of partial-object masks and the object mask; determining that the selection request of the target object in the digital image corresponds to the object mask and a partial-object mask of the plurality of partial-object masks; and indicating that the object mask and the partial-object mask correspond to the target object in response to detecting the selection request of the target object in the digital image.

In some implementations, the series of acts 1200 includes acts of verifying object mask consistency of the modified set of object masks by determining that a pixel in the digital image is assigned to multiple object masks in the modified set of object masks having the same hierarchy level, determining a correspondence between the pixel and each of the object masks of the multiple object masks based on the determination, and assigning the pixel to the object mask of the multiple object masks having a greater, higher, greatest, largest, or highest correspondence while unassigning the pixel from other object masks of the multiple object masks.

In various implementations, the series of acts 1200 includes an act of generating a refined object mask for one or more object masks in the set of object masks utilizing one or more of a plurality of object segmentation machine-learning models including a specialist object segmentation machine-learning model and a partial-object segmentation machine-learning model. In additional implementations, the series of acts 1200 includes an act of refining multiple object masks in the set of object masks simultaneously utilizing the plurality of object segmentation machine-learning models.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the multi-model object segmentation system to automatically select objects and partial objects on digital images as described herein.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media is any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which stores desired program code in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links for carrying desired program code in the form of computer-executable instructions or data structures and which is accessible by a general-purpose or special-purpose computer. Combinations of the above should also be included within the scope of computer-readable media.

Further, upon reaching various computer system components, program code means in the form of computer-executable instructions or data structures is transferred automatically from transmission media to non-transitory computer-readable storage media (devices) (or vice versa). For example, computer-executable instructions or data structures received over a network or data link is buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) optionally is included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure optionally are implemented in cloud computing environments. As used herein, the term "cloud computing" refers to a model for enabling on-demand network access to a shared pool of configurable computing resources. For example, cloud computing optionally is utilized in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model optionally is composed of various characteristics such as, for example, on-demand self-service, broad network access, resource pooling, rapid elasticity, measured service, and so forth. A cloud-computing model optionally implements various service models, such as, for example, Software as a Service ("SaaS"), Platform as a Service ("PaaS"), and Infrastructure as a Service ("IaaS"). A cloud-computing model is deployable using different deployment models such as private cloud, community cloud, public cloud, hybrid cloud, and so forth. In addition, as used herein, the term "cloud-computing environment" refers to an environment in which cloud computing is utilized.

Figure 13:
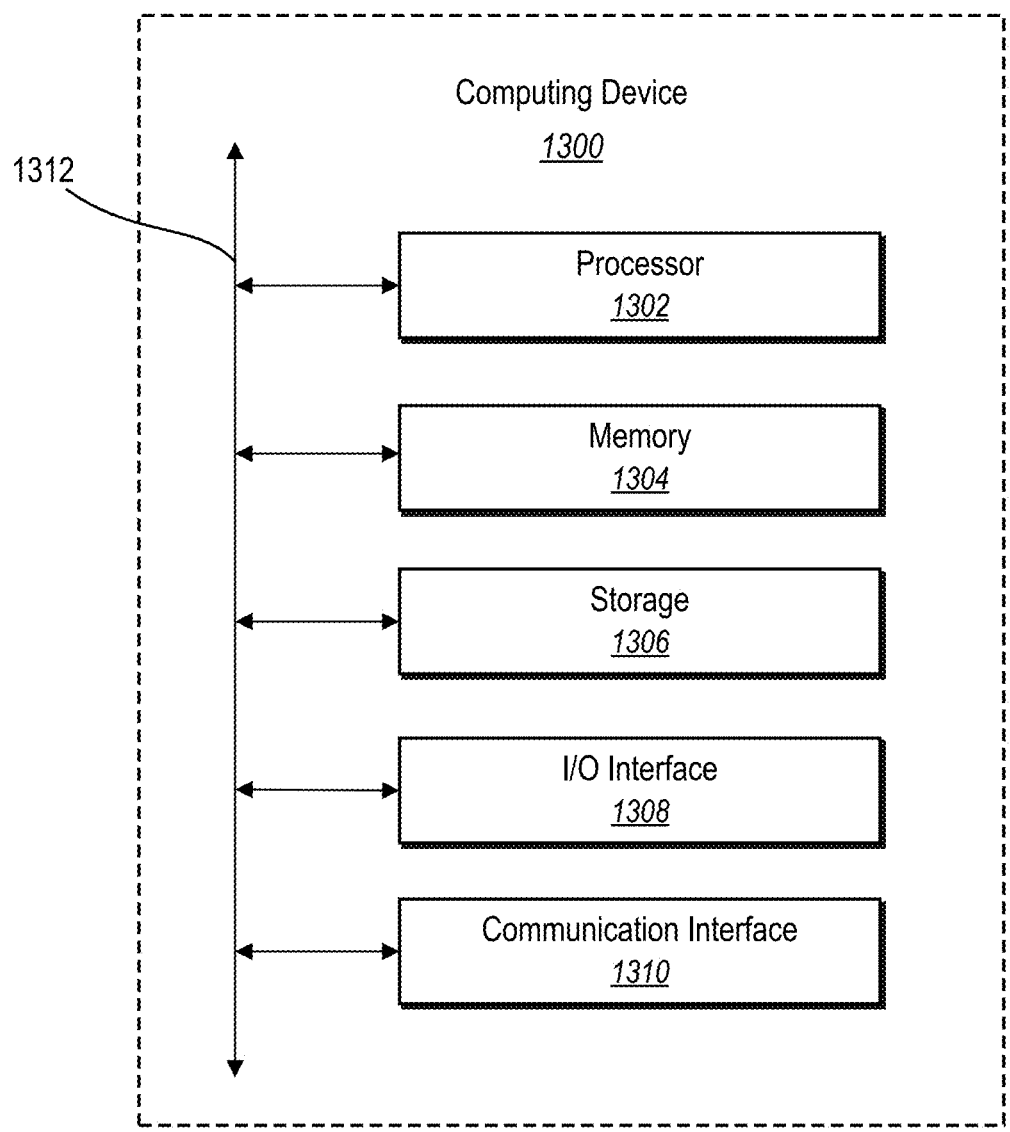
FIG. 13 illustrates a block diagram of an example computing device for implementing one or more implementations of the present disclosure.

FIG. 13 illustrates a block diagram of a computing device 1300 that may be configured to perform one or more of the processes described above. One will appreciate that one or more computing devices, such as the computing device 1300 may represent the computing devices described above (e.g., the client device 102, the server device 108, the client device 1000, or the computing device 1100). In one or more implementations, the computing device 1300 may be a mobile device (e.g., a laptop, a tablet, a smartphone, a mobile telephone, a camera, a tracker, a watch, a wearable device, etc.). In some implementations, the computing device 1300 may be a non-mobile device (e.g., a desktop computer, a server device, a web server, a file server, a social networking system, a program server, an application store, or a content provider). Further, the computing device 1300 may be a server device that includes cloud-based processing and storage capabilities.

As shown in FIG. 13, the computing device 1300 includes one or more processor(s) 1302, memory 1304, a storage device 1306, I/O interfaces 1308 (i.e., input/output interfaces), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other implementations. Furthermore, in certain implementations, the computing device 1300 includes fewer components than those shown in FIG. 13. Components of the computing device 1300 shown in FIG. 13 will now be described in additional detail.

In particular implementations, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more volatile and/or non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 includes a non-transitory storage medium described above. The storage device 1306 may include a hard disk drive (HDD), flash memory, a Universal Serial Bus (USB) drive, or a combination of these or other storage devices.

As shown, the computing device 1300 includes one or more I/O interfaces 1308, which are provided to allow a user to provide input to (e.g., user strokes), receive output from, and otherwise transfer data to and from the computing device 1300. These I/O interfaces 1308 may include a mouse, keypad, or a keyboard, a touch screen, camera, optical scanner, network interface, modem, another known I/O device, or a combination of these I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1308 are configured to provide graphical data to a display for presentation to a user. The graphical data may be representative of one or more graphical user interfaces and/or any other graphical content as may serve a particular implementation.

The computing device 1300 further includes a communication interface 1310. The communication interface 1310 includes hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 further includes a bus 1312. The bus 1312 includes hardware, software, or both that connects components of computing device 1300.

In the foregoing specification, the invention has been described regarding specific example implementations thereof. Various implementations and aspects of the invention(s) are described regarding details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing executable instructions that, when executed by a processing device, cause the processing device to perform operations comprising:
generating a first set of object masks for a digital image comprising a plurality of objects utilizing a first object segmentation model;
generating a second set of object masks for the digital image utilizing a second object segmentation model;
detecting an overlap between a first object mask from the first set of object masks and a second object mask from the second set of object masks;
merging the overlapping first and second object masks to generate a combined object mask for the digital image;
generating a third set of object masks for the digital image that comprises the combined object mask and non-overlapping object masks from one or more of the first set of object masks or the second set of object masks;
determining that an object mask of the third set of object masks corresponds to a specialist object segmentation neural network;
generating, utilizing the specialist object segmentation neural network, an updated object mask for the object mask of the third set of object masks;
replacing the object mask of the third set of object masks in the third set of object masks with the updated object mask; and
based on detecting a selection request of a target object in the digital image, providing an object mask of the target object from the third set of object masks for the digital image.

2. The non-transitory computer-readable medium of claim 1, wherein detecting the overlap between the first object mask and the second object mask comprises determining that a first set of pixels included in the first object mask overlaps a second set of pixels included in the second object mask by at least a pixel overlap threshold amount.

3. The non-transitory computer-readable medium of claim 2, wherein detecting the overlap between the first object mask and the second object mask comprises matching object classification labels associated with the first object mask and the second object mask.

4. The non-transitory computer-readable medium of claim 1, wherein merging the overlapping first and second object masks comprises:
identifying a set of non-overlapping pixels in the first object mask from the first set of object masks that is non-overlapping with the second object mask from the second set of object masks; and
generating the combined object mask by adding the set of non-overlapping pixels to the pixels included in the second object mask.

5. The non-transitory computer-readable medium of claim 1, further comprising instructions that, when executed by the processing device, cause the processing device to refine the combined object mask by utilizing an object mask machine-learning model to improve segmentation of a corresponding object in the digital image.

6. The non-transitory computer-readable medium of claim 1, wherein generating the first set of object masks for the digital image utilizing the first object segmentation model comprises utilizing a first object segmentation neural network that segments known object classes within the digital image; and
wherein generating the second set of object masks for the digital image utilizing the second object segmentation model comprises utilizing a second object segmentation neural network that segments semantic objects within the digital image.

7. The non-transitory computer-readable medium of claim 1, further comprising instructions that, when executed by the processing device, cause the processing device to classify each segmented object in the digital image corresponding to the first set of object masks.

8. The non-transitory computer-readable medium of claim 1, further comprising instructions that, when executed by the processing device, cause the processing device to:
determine that the object mask of the third set of object masks corresponds to the specialist object segmentation neural network based on a classification label assigned to the object mask of the third set of object masks; and
based on determining that the object mask of the third set of object masks corresponds to the specialist object segmentation neural network, provide the object mask of the third set of object masks and the digital image to the specialist object segmentation neural network to generate the updated object mask.

9. The non-transitory computer-readable medium of claim 1, further comprising instructions that, when executed by the processing device, cause the processing device to:
determine that an object mask of the third set of object masks corresponds to a partial-object segmentation neural network based on a classification label assigned to the object mask of the third set of object masks;
based on determining that the object mask of the third set of object masks corresponds to the partial-object segmentation neural network, provide the object mask of the third set of object masks and the digital image to the partial-object segmentation neural network to generate a plurality of partial-object masks within the object mask of the third set of object masks; and
update the third set of object masks to add the plurality of partial-object masks as sub-masks within the object mask of the third set of object masks.

10. The non-transitory computer-readable medium of claim 9, further comprising instructions that, when executed by the processing device, cause the processing device to:
identify an object mask hierarchy between the plurality of partial-object masks and the object mask of the third set of object masks;
determine that the selection request of the target object in the digital image corresponds to the object mask of the third set of object masks and a partial-object mask of the plurality of partial-object masks; and
in response to detecting the selection request of the target object in the digital image, indicate that the object mask of the third set of object masks and the partial-object mask correspond to the target object.

11. A method comprising:
generating a first set of object masks for a digital image comprising a plurality of objects utilizing a first object segmentation model;
generating a second set of object masks for the digital image utilizing a second object segmentation model;

detecting an overlap between a first object mask from the first set of object masks and a second object mask from the second set of object masks;
merging the overlapping first and second object masks to generate a combined object mask for the digital image;
generating a third set of object masks for the digital image that comprises the combined object mask and non-overlapping object masks from one or more of the first set of object masks or the second set of object masks;
determining that an object mask of the third set of object masks corresponds to a partial-object segmentation neural network;
generating, utilizing the partial-object segmentation neural network, a plurality of partial-object masks within the object mask of the third set of object masks;
updating the third set of object masks to add the plurality of partial-object masks as sub-masks within the object mask of the third set of object masks; and
based on detecting a selection request of a target object in the digital image, providing an object mask of the target object from the third set of object masks for the digital image.

12. The method of claim 11, wherein detecting the overlap between the first object mask and the second object mask comprises determining that a first set of pixels included in the first object mask overlaps a second set of pixels included in the second object mask by at least a pixel overlap threshold amount.

13. The method of claim 11, wherein detecting the overlap between the first object mask and the second object mask comprises matching object classification labels associated with the first object mask and the second object mask.

14. The method of claim 11, wherein merging the overlapping first and second object masks comprises:
identifying a set of non-overlapping pixels in the first object mask from the first set of object masks that is non-overlapping with the second object mask from the second set of object masks; and
generating the combined object mask by adding the set of non-overlapping pixels to the pixels included in the second object mask.

15. The method of claim 11, further comprising:
determining that an object mask of the third set of object masks corresponds to a specialist object segmentation neural network based on a classification label assigned to the object mask of the third set of object masks;
based on determining that the object mask of the third set of object masks corresponds to the specialist object segmentation neural network, providing the object mask of the third set of object masks and the digital image to the specialist object segmentation neural network to generate an updated object mask; and
replacing the object mask of the third set of object masks in the third set of object masks with the updated object mask.

16. A system comprising:
a memory component; and
one or more processing devices coupled to the memory component, the one or more processing devices to perform operations comprising:
generating a first set of object masks for a digital image comprising a plurality of objects utilizing a first object segmentation model;
generating a second set of object masks for the digital image utilizing a second object segmentation model;
detecting an overlap between a first object mask from the first set of object masks and a second object mask from the second set of object masks;
merging the overlapping first and second object masks to generate a combined object mask for the digital image;
generating a third set of object masks for the digital image that comprises the combined object mask and non-overlapping object masks from one or more of the first set of object masks or the second set of object masks;
determining that an object mask of the third set of object masks corresponds to a specialist object segmentation neural network;
generating, utilizing the specialist object segmentation neural network, an updated object mask for the object mask of the third set of object masks;
replacing the object mask of the third set of object masks in the third set of object masks with the updated object mask; and
based on detecting a selection request of a target object in the digital image, providing an object mask of the target object from the third set of object masks for the digital image.

17. The system of claim 16, wherein the operations further comprise refining the combined object mask by utilizing an object mask machine-learning model to improve segmentation of a corresponding object in the digital image.

18. The system of claim 16, wherein generating the first set of object masks for the digital image utilizing the first object segmentation model comprises utilizing a first object segmentation neural network that segments known object classes within the digital image, and wherein generating the second set of object masks for the digital image utilizing the second object segmentation model comprises utilizing a second object segmentation neural network that segments semantic objects within the digital image.

19. The system of claim 16, wherein the operations further comprise:
determining that an object mask of the third set of object masks corresponds to a partial-object segmentation neural network based on a classification label assigned to the object mask of the third set of object masks;
based on determining that the object mask of the third set of object masks corresponds to the partial-object segmentation neural network, providing the object mask of the third set of object masks and the digital image to the partial-object segmentation neural network to generate a plurality of partial-object masks within the object mask of the third set of object masks; and
updating the third set of object masks to add the plurality of partial-object masks as sub-masks within the object mask of the third set of object masks.

20. The system of claim 19, wherein the operations further comprise:
identifying an object mask hierarchy between the plurality of partial-object masks and the object mask of the third set of object masks;
determining that the selection request of the target object in the digital image corresponds to the object mask of the third set of object masks and a partial-object mask of the plurality of partial-object masks; and
in response to detecting the selection request of the target object in the digital image, indicating that the object mask of the third set of object masks and the partial-object mask correspond to the target object.

\* \* \* \* \*